United States Patent
Castro et al.

(10) Patent No.: US 8,966,389 B2
(45) Date of Patent: Feb. 24, 2015

(54) VISUAL INTERFACE FOR IDENTIFYING POSITIONS OF INTEREST WITHIN A SEQUENTIALLY ORDERED INFORMATION ENCODING

(75) Inventors: Alexander Castro, Seattle, WA (US); Jonathan Thompson, Seattle, WA (US); Daniel Thompson, Kansas City, MO (US)

(73) Assignee: Limelight Networks, Inc., Tempe, AZ (US)

( * ) Notice: Subject to any disclaimer, the term of this patent is extended or adjusted under 35 U.S.C. 154(b) by 927 days.

(21) Appl. No.: 11/903,279

(22) Filed: Sep. 21, 2007

(65) Prior Publication Data

US 2008/0077583 A1    Mar. 27, 2008

Related U.S. Application Data

(60) Provisional application No. 60/846,484, filed on Sep. 22, 2006.

(51) Int. Cl.
| | |
|---|---|
| *G06F 3/00* | (2006.01) |
| *G06F 3/048* | (2013.01) |
| *G06F 17/30* | (2006.01) |

(52) U.S. Cl.
CPC ...... *G06F 17/30746* (2013.01); *G06F 17/3028* (2013.01); *G06F 17/30696* (2013.01); *G06F 17/30775* (2013.01); *G06F 17/30796* (2013.01); *G06F 17/30805* (2013.01); *G06F 17/30831* (2013.01); *G06F 17/3084* (2013.01); *G06F 17/30985* (2013.01)
USPC .......................................... 715/772; 715/727

(58) Field of Classification Search
USPC ................... 715/730, 772, 780, 727
See application file for complete search history.

(56) References Cited

U.S. PATENT DOCUMENTS

| | | | |
|---|---|---|---|
| 5,892,536 A | 4/1999 | Logan et al. | |
| 6,070,158 A | 5/2000 | Kirsch et al. | |
| 6,192,360 B1 | 2/2001 | Dumais et al. | |

(Continued)

FOREIGN PATENT DOCUMENTS

| | | |
|---|---|---|
| CN | 1452098 A | 10/2003 |
| CN | 101128818 A | 2/2008 |

(Continued)

OTHER PUBLICATIONS

U.S. Appl. No. 12/077,590, Office Action dated Jun. 7, 2010, 16 pages.

(Continued)

*Primary Examiner* — Thanh Vu

(57) ABSTRACT

Embodiments of the present invention provide intuitive, easily used, and efficient visual representation of positions of interest to a user within a sequentially ordered information encoding. In particular, various embodiments of the present invention provide a heat-map-like representation of the relatedness, at each location or position within a sequentially ordered information encoding, of the contents of the information encoding at or near the position to a specified search criterion. The heat-map visual representation allows a user to identify positions of particular interest, with respect to the specified search criterion, and to directly access the information at those positions, allowing the user to avoid time-consuming and inefficient hit-or-miss searching techniques.

22 Claims, 21 Drawing Sheets

(56) References Cited

U.S. PATENT DOCUMENTS

| | | | |
|---|---|---|---|
| 6,286,006 B1 | 9/2001 | Bharat et al. | |
| 6,411,725 B1 | 6/2002 | Rhoads | |
| 6,523,000 B1 | 2/2003 | Ando et al. | |
| 6,546,556 B1 | 4/2003 | Kataoka et al. | |
| 6,553,365 B1 | 4/2003 | Summerlin et al. | |
| 6,636,238 B1 * | 10/2003 | Amir et al. | 715/730 |
| 6,665,640 B1 | 12/2003 | Bennett et al. | |
| 6,665,659 B1 | 12/2003 | Logan | |
| 6,675,159 B1 | 1/2004 | Lin et al. | |
| 6,681,227 B1 | 1/2004 | Kojima et al. | |
| 6,700,932 B2 | 3/2004 | Shen et al. | |
| 6,714,909 B1 | 3/2004 | Gibbon et al. | |
| 6,721,361 B1 | 4/2004 | Covell et al. | |
| 6,782,394 B1 | 8/2004 | Landeck et al. | |
| 6,877,002 B2 | 4/2005 | Prince | |
| 6,901,398 B1 | 5/2005 | Horvitz et al. | |
| 7,073,193 B2 | 7/2006 | Marsh | |
| 7,082,162 B2 | 7/2006 | Prakash et al. | |
| 7,096,208 B2 | 8/2006 | Zaragoza et al. | |
| 7,185,008 B2 | 2/2007 | Kawatani | |
| 7,206,303 B2 | 4/2007 | Karas et al. | |
| 7,210,100 B2 | 4/2007 | Berger et al. | |
| 7,257,577 B2 | 8/2007 | Fagin et al. | |
| 7,260,773 B2 | 8/2007 | Zernik | |
| 7,281,260 B2 | 10/2007 | Puente et al. | |
| 7,490,092 B2 | 2/2009 | Sibley et al. | |
| 7,519,565 B2 | 4/2009 | Prakash et al. | |
| 7,542,969 B1 | 6/2009 | Rappaport et al. | |
| 7,606,444 B1 | 10/2009 | Erol et al. | |
| 7,650,572 B2 | 1/2010 | Olander et al. | |
| 7,673,234 B2 | 3/2010 | Kao et al. | |
| 7,680,853 B2 * | 3/2010 | Yu et al. | 707/708 |
| 7,689,578 B2 | 3/2010 | Albornoz et al. | |
| 7,711,193 B2 | 5/2010 | Sanford | |
| 7,743,061 B2 | 6/2010 | Jones et al. | |
| 7,752,186 B2 | 7/2010 | Abajian | |
| 7,917,492 B2 | 3/2011 | Bargeron et al. | |
| 7,930,714 B2 | 4/2011 | Konig et al. | |
| 8,065,604 B2 | 11/2011 | Blankinship | |
| 8,073,194 B2 | 12/2011 | Lienhart et al. | |
| 8,098,976 B1 | 1/2012 | Acharya | |
| 8,117,206 B2 | 2/2012 | Sibley et al. | |
| 2002/0022956 A1 | 2/2002 | Ukrainczyk et al. | |
| 2002/0120925 A1 | 8/2002 | Logan | |
| 2003/0030752 A1 | 2/2003 | Begeja et al. | |
| 2003/0037073 A1 | 2/2003 | Tokuda et al. | |
| 2003/0126214 A1 | 7/2003 | Oliszewski | |
| 2003/0229604 A1 | 12/2003 | Zaragoza et al. | |
| 2004/0093564 A1 | 5/2004 | Kumhyr et al. | |
| 2004/0102958 A1 | 5/2004 | Anderson | |
| 2004/0162827 A1 | 8/2004 | Nakano | |
| 2004/0186743 A1 | 9/2004 | Cordero | |
| 2004/0199547 A1 | 10/2004 | Winter et al. | |
| 2004/0230892 A1 | 11/2004 | Horton | |
| 2005/0004897 A1 * | 1/2005 | Lipson et al. | 707/3 |
| 2005/0021502 A1 | 1/2005 | Chen et al. | |
| 2005/0022106 A1 | 1/2005 | Kawai | |
| 2005/0028194 A1 | 2/2005 | Elenbaas et al. | |
| 2005/0086224 A1 | 4/2005 | Franciosa et al. | |
| 2005/0138540 A1 | 6/2005 | Baltus et al. | |
| 2005/0198006 A1 | 9/2005 | Boicey et al. | |
| 2005/0222975 A1 | 10/2005 | Nayak et al. | |
| 2005/0246739 A1 | 11/2005 | Davidson | |
| 2005/0262050 A1 | 11/2005 | Fagin et al. | |
| 2005/0262432 A1 | 11/2005 | Wagner | |
| 2005/0268221 A1 | 12/2005 | Shur et al. | |
| 2006/0031217 A1 | 2/2006 | Smith et al. | |
| 2006/0047632 A1 | 3/2006 | Zhang | |
| 2006/0075205 A1 | 4/2006 | Martin et al. | |
| 2006/0110057 A1 | 5/2006 | Liu et al. | |
| 2006/0114992 A1 | 6/2006 | Shibata et al. | |
| 2006/0155693 A1 | 7/2006 | Chowdhury et al. | |
| 2006/0183089 A1 | 8/2006 | Gleissner et al. | |
| 2006/0195859 A1 | 8/2006 | Konig et al. | |
| 2006/0248458 A1 | 11/2006 | Li | |
| 2006/0288015 A1 | 12/2006 | Schirripa et al. | |
| 2007/0061728 A1 | 3/2007 | Sitomer et al. | |
| 2007/0118391 A1 | 5/2007 | Malaney et al. | |
| 2007/0130007 A1 | 6/2007 | Haberman et al. | |
| 2007/0168413 A1 | 7/2007 | Barletta et al. | |
| 2007/0192192 A1 | 8/2007 | Haberman et al. | |
| 2007/0201558 A1 | 8/2007 | Xu et al. | |
| 2007/0203885 A1 | 8/2007 | Kim et al. | |
| 2007/0219778 A1 | 9/2007 | Whittaker et al. | |
| 2007/0226204 A1 | 9/2007 | Feldman | |
| 2007/0245242 A1 | 10/2007 | Yagnik | |
| 2008/0077583 A1 | 3/2008 | Castro et al. | |
| 2008/0086453 A1 | 4/2008 | Fabian | |
| 2008/0120290 A1 | 5/2008 | Delgo et al. | |
| 2008/0126319 A1 | 5/2008 | Bukai et al. | |
| 2009/0083256 A1 | 3/2009 | Thompson et al. | |
| 2009/0083257 A1 | 3/2009 | Bargeron et al. | |
| 2009/0094189 A1 | 4/2009 | Stephens | |
| 2009/0094520 A1 | 4/2009 | Kulas | |
| 2009/0116736 A1 | 5/2009 | Neogi et al. | |
| 2009/0174526 A1 * | 7/2009 | Howard et al. | 340/5.52 |
| 2009/0182644 A1 | 7/2009 | Panagopulos et al. | |
| 2009/0210395 A1 | 8/2009 | Sedam | |
| 2009/0222442 A1 | 9/2009 | Houh | |
| 2009/0254540 A1 | 10/2009 | Musgrove et al. | |
| 2009/0271380 A1 | 10/2009 | Julia et al. | |
| 2009/0287676 A1 | 11/2009 | Dasdan | |
| 2010/0131336 A1 | 5/2010 | Steelberg et al. | |
| 2010/0249976 A1 | 9/2010 | Aharoni et al. | |
| 2010/0287473 A1 | 11/2010 | Recesso et al. | |
| 2010/0293174 A1 | 11/2010 | Bennett et al. | |
| 2011/0225136 A1 | 9/2011 | Tu et al. | |
| 2011/0282879 A1 | 11/2011 | Bargeron et al. | |

FOREIGN PATENT DOCUMENTS

| | | | |
|---|---|---|---|
| CN | 101059806 A | 7/2009 | |
| KR | 20030014804 A | 2/2003 | |

OTHER PUBLICATIONS

U.S. Appl. No. 12/077,590, Notice of Allowance dated Apr. 20, 2012, 19 pages.

U.S. Appl. No. 12/077,590, Office Action dated Nov. 20, 2011, 19 pages.

Extracting and Preparing Metadata to Make Video Files Searchable, Telestream, Retrieved on Mar. 15, 2012, from http://www.telestream.net/pdfs/whitepapers/wp-preparing-video-metadata.pdf, 6 pages.

Milic-Frayling, "Text Processing and information retrieval," Chapter 1, Text Mining and its Applications to Intelligence, CRM and Knowledge Management, Jan. 1, 2005, 44 pages, Microsoft Corporation.

Natsev, et al., "Semantic Concept-Based Query Expansion and Re-ranking for Multimedia Retrieval," Proceedings of the 15th International Conference on Multimedia, Jan. 1, 2007, 10 pages, New York, New York.

Pooch, et al., "A survey of Indexing Techniques for Sparse Matrices," Comparing Surveys, Jun. 1973, 26 pages, vol. 5, No. 2, New York, NY.

European Search Report of 09723190.6 mailed on Aug. 23, 2012, 6 pages.

Natasa Milic-Frayling: "Text processing and information retrieval" In: "Text Mining and its Applications to Intelligence, CRM and Knowledge Management", Jan. 1, 2005, 44 pgs. (Microsoft Corporation, XP55035433).

U.S. Appl. No. 13/048,268 First Action Interview Office Action mailed Apr. 17, 2013, 15 pages.

U.S. Appl. No. 12/077,590, Final Office Action dated Jan. 10, 2011, 16 pages.

U.S. Appl. No. 12/077,591, Notice of Allowance dated Nov. 24, 2010, 20 pages.

U.S. Appl. No. 13/245,840, Non-Final Office Action dated Dec. 1, 2011, 22 pages.

* cited by examiner

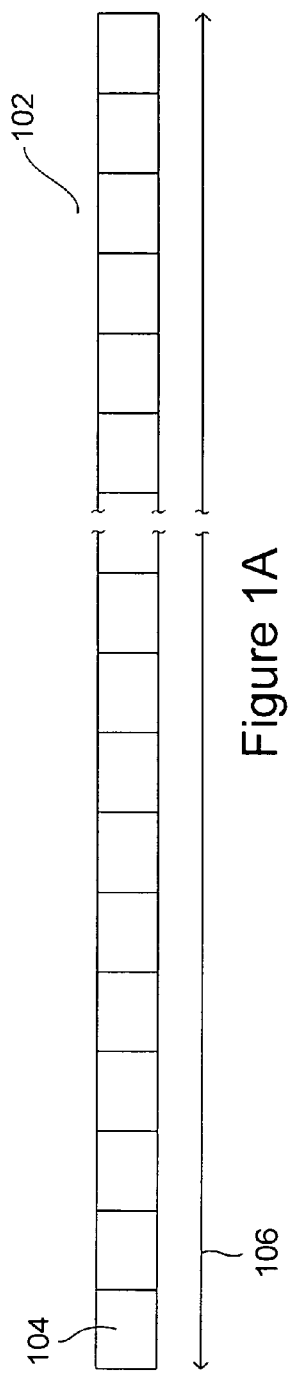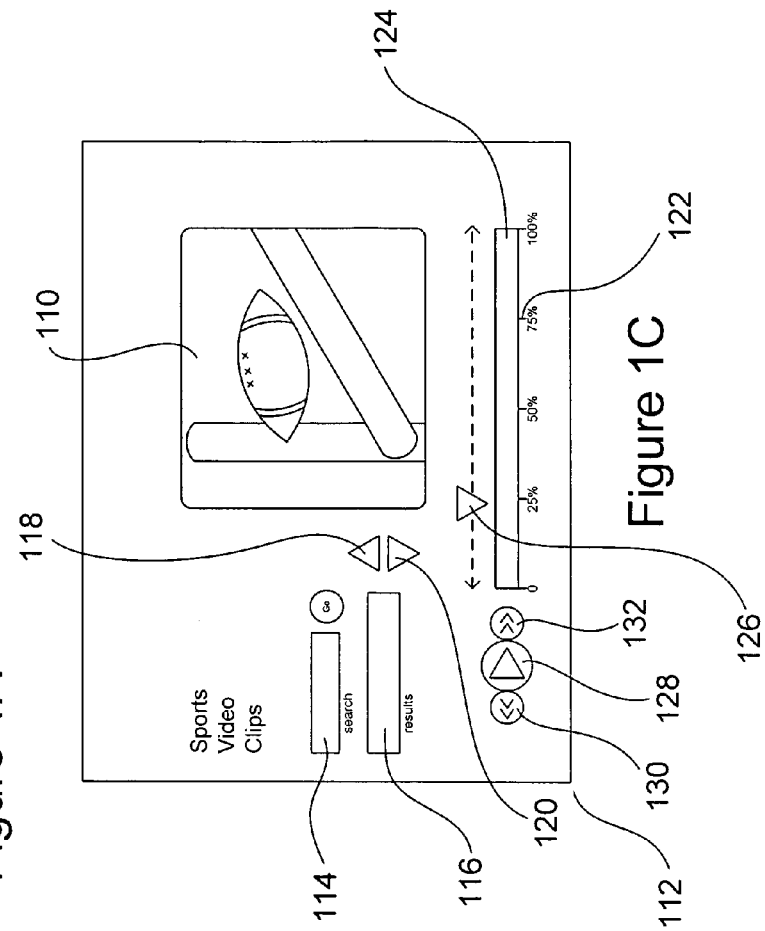

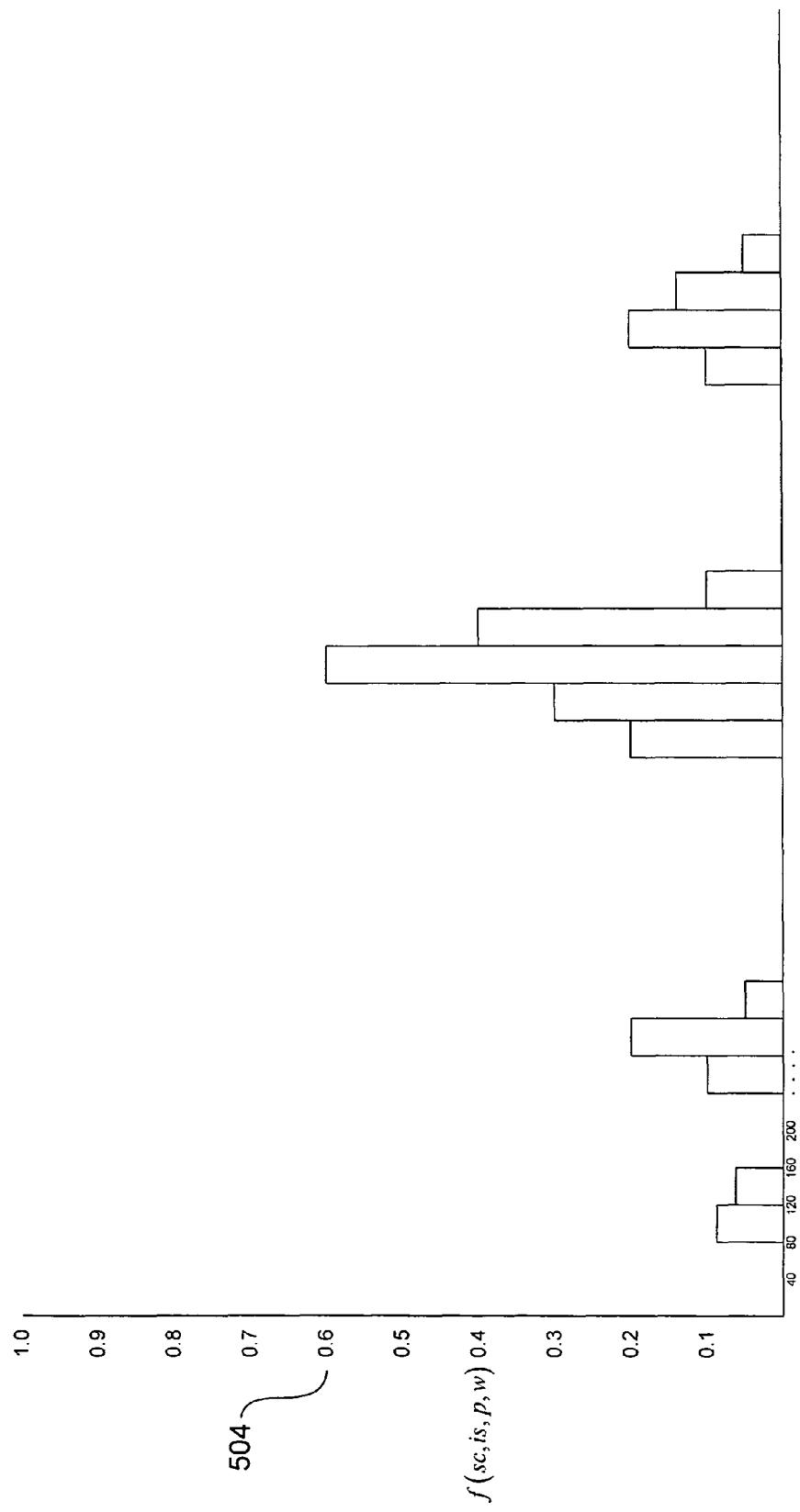

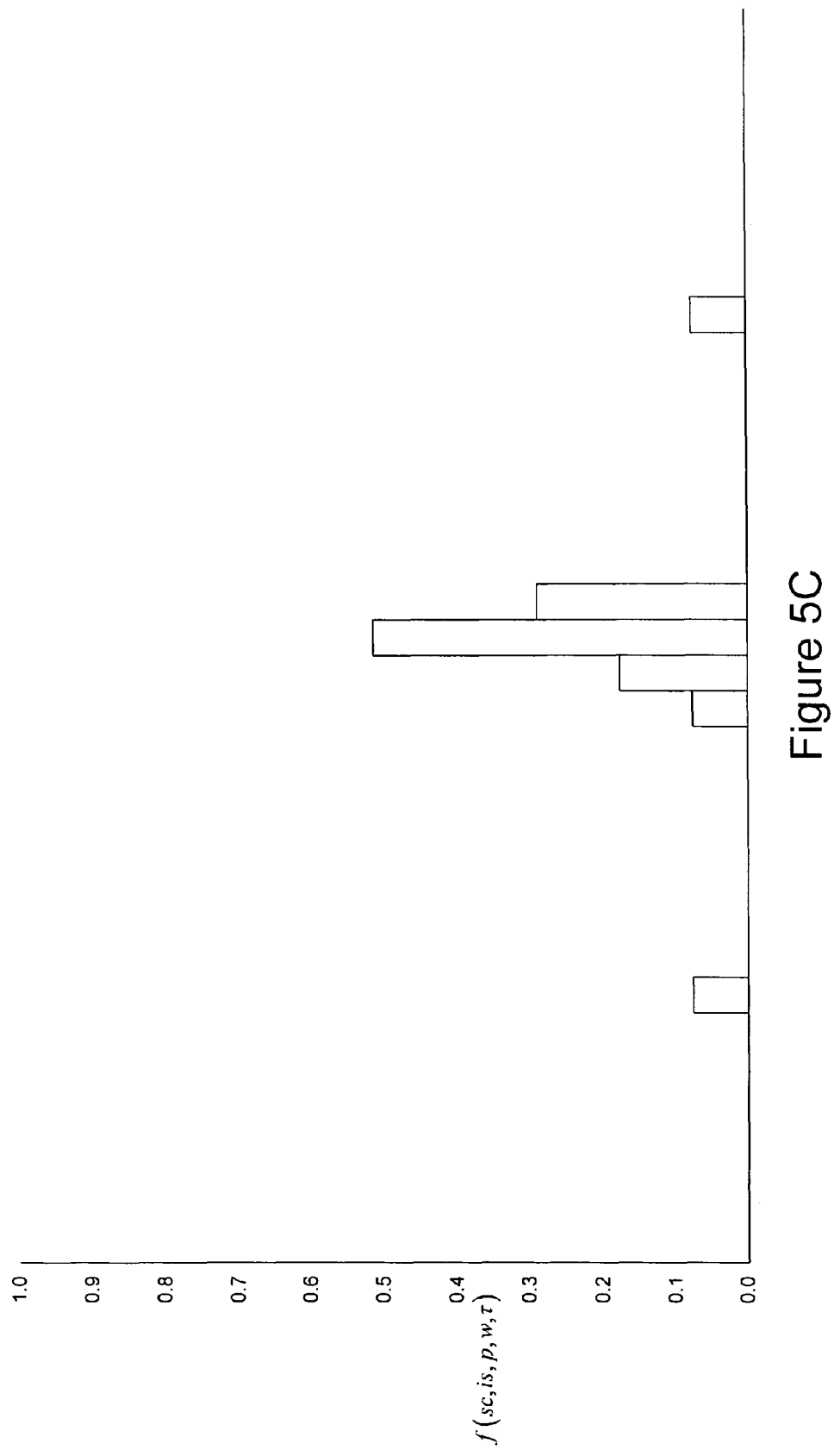

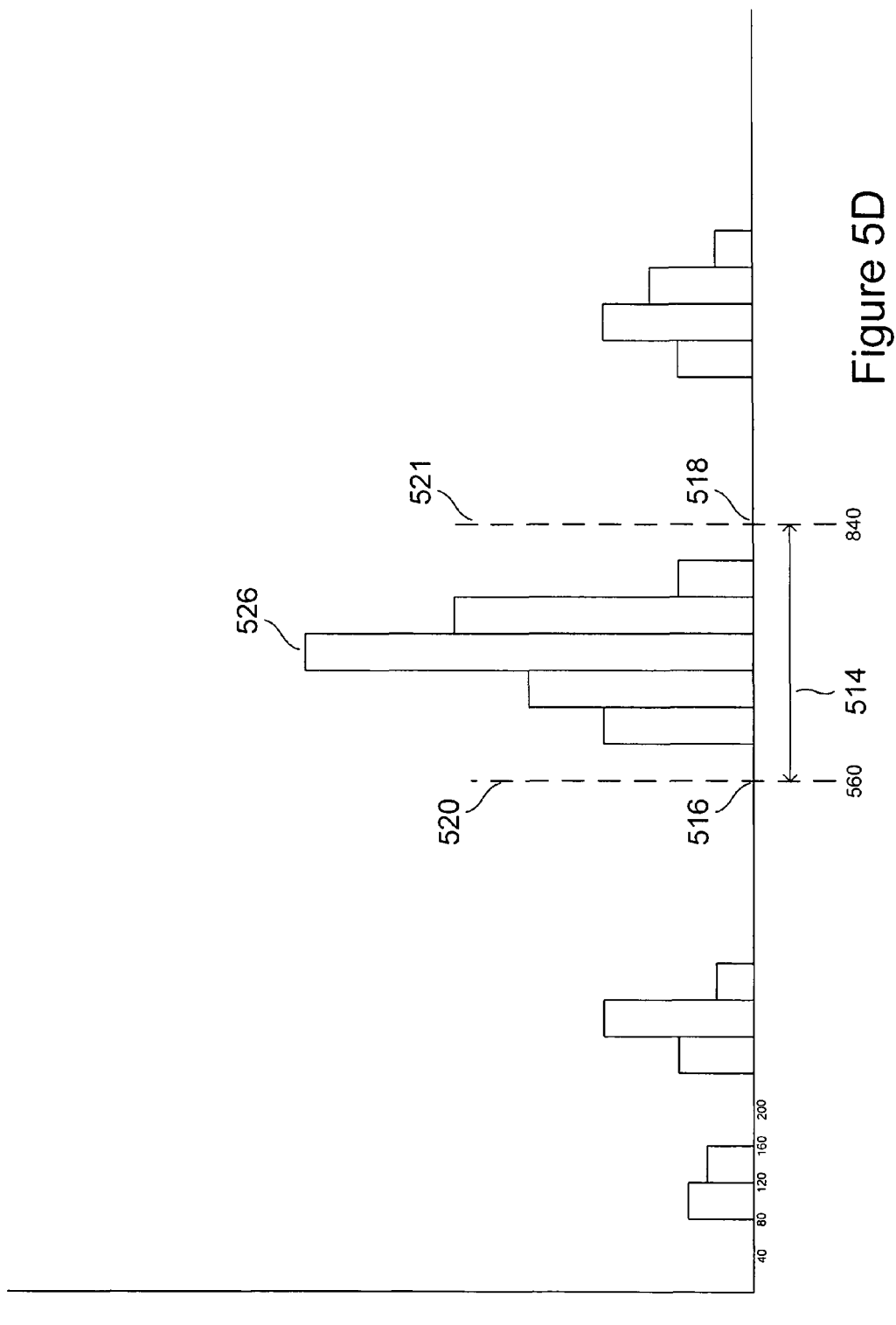

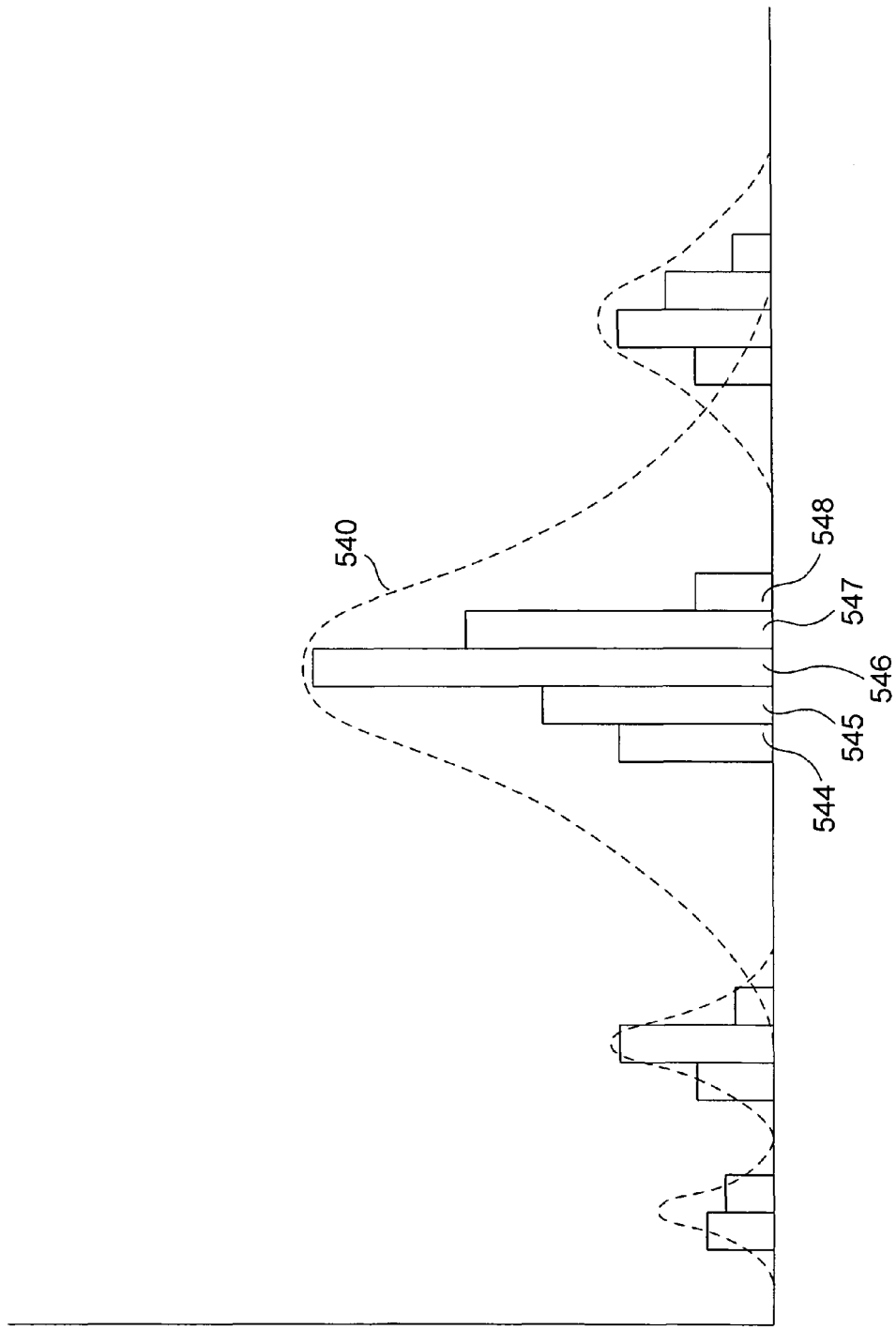

| Abbreviations | Parameter |
|---|---|
| TIS | Type of Information Stream |
| TSC | Type of Search Criteria |
| TS | Type of Score |
| D | Subject – Matter Domain |
| SM | Degree of Smoothing. |
| SC | Search Criteria |
| Ps | Start Position |
| Pf | End Position |
| Inc | Position Increment |
| $W_1$ | Window (possibly multiple windows) |
| $W_2$ | |
| $t_1$ | Threshold (possibly multiple thresholds) |
| $t_2$ | |
| IS | Information Stream |

602 — result = F(score_buffer[ ] score, TIS, TSC, TS, D, SM, SC, $P_s$, $P_f$, Inc, W, $t$, IS)

604 — result = $F_{TIS, TSC, TS, D, SM}$ (score_buffer score, SC, $P_s$, $P_f$, Inc, W, $t$, IS)

605 — score = $F_{TIS, TSC, TS, D, SM, W, t}$(IS, P, SC)

Figure 6

VISUAL INTERFACE FOR IDENTIFYING POSITIONS OF INTEREST WITHIN A SEQUENTIALLY ORDERED INFORMATION ENCODING

CROSS-REFERENCE TO RELATED APPLICATION

This application claims the benefit of Provisional Application No. 60/846,484, filed Sep. 22, 2006.

TECHNICAL FIELD

The present invention is related to graphical user interfaces ("GUIs") and searching, and, in particular, to a visual interface that provides for rapid identification and access of information related to, or described by, search criteria within a sequentially ordered information encoding.

BACKGROUND OF THE INVENTION

In the early days of computing, information was generally encoded as formatted alphanumeric character strings or as unformatted ordered sequences of information-storage units, typically bytes. As computing hardware, operating systems, and computer applications have together evolved, many different types of information encodings have been developed, and a very large variety of different types of information are now routinely electronically encoded, stored, exchanged, and rendered for access by users, including text files, specially formatted application-specific files, audio recordings, video recordings, and multimedia presentations. While, in early days of computing, data was primarily rendered as character strings displayed on monochromatic, 24-line terminals, the many different types of information currently electronically encoded and distributed by computer systems are rendered for presentation to human users by a variety of different application programs, including text and image editors, video players, audio players, and web browsers.

An important class of information comprises information encoded as an ordered sequence of information units that are sequentially rendered for display or presentation to a human user. An MPEG-encoded video file is one example of a sequentially ordered information encoding. MPEG encoding employs a number of rather complex layers of different types of encoding methods compactly encode a video stream and/or audio stream. In general, video frames are reconstructed from an MPEG-encoded video file frame-by-frame, in sequence. Rendering of an MPEG-encoded video file provides a stream of video frames and an audio stream. Rendering applications and devices generally allow a user to start or resume rendering of the video file, to stop rendering of the video file, and to skip forward or backward to selected positions within a video stream.

In many cases, a user may only be interested in a certain portion of a video presentation. For example, a particular user may be interested only in a weather report included in a local television news broadcast that includes reviews of current local and national events, reviews of sporting events, and presentations of human-interest stories in addition to the weather report. In many cases, video presentations may not be indexed by sections, in order to facilitate direct access to portions of the video presentation of interest to a user, or may be indexed at a very coarse topic granularity, requiring a user to employ a hit-or-miss strategy of starting, stopping, advancing, and reversing the video stream by relatively crude techniques in order to locate portions of interest. In addition to encoded video, there are many other types of sequentially ordered information encodings that are sequentially rendered for human perception, including pure audio recordings, various types of multimedia presentations, images of pages within books and text documents, and other such information encodings. In many cases, searching for portions of the encoded information of interest to human users is currently limited to the above-described stop/start/advance/and reverse operations familiar to users of video-rendering applications and many video-signal-rendering devices. Designers and manufacturers of computers and other electronic devices that render sequentially ordered information encodings for presentation to human users, designers, implementers, vendors and users of information-rendering applications, including media players, web browsers, and control programs, and many others involved in recording, disseminating, and rendering information have recognized the need for more effective searching tools to allow users to identify and efficiently access portions of an information encoding of interest to those to whom the information is rendered.

SUMMARY OF THE INVENTION

Embodiments of the present invention provide intuitive, easily used, and efficient visual representation of positions of interest to a user within a sequentially ordered information encoding. In particular, various embodiments of the present invention provide a heat-map-like representation of the relatedness, at each location or position within a sequentially ordered information encoding, of the contents of the information encoding at or near the position to a specified search criterion. The heat-map visual representation allows a user to identify positions of particular interest, with respect to the specified search criterion, and to directly access the information at those positions, allowing the user to avoid time-consuming and inefficient hit-or-miss searching techniques.

BRIEF DESCRIPTION OF THE DRAWINGS

FIGS. 1A-C illustrate sequentially ordered information encodings.

FIGS. 5A-G illustrate an exemplary relatedness function and various operations that may be performed on, or incorporated within, a relatedness function.

FIG. 6 shows a table of parameters, and parameter abbreviations, for various different types of parameters that may be used to specify specific relatedness functions for use in implementing visual interfaces that represent embodiments of the present invention.

DETAILED DESCRIPTION OF THE INVENTION

Figure 2:
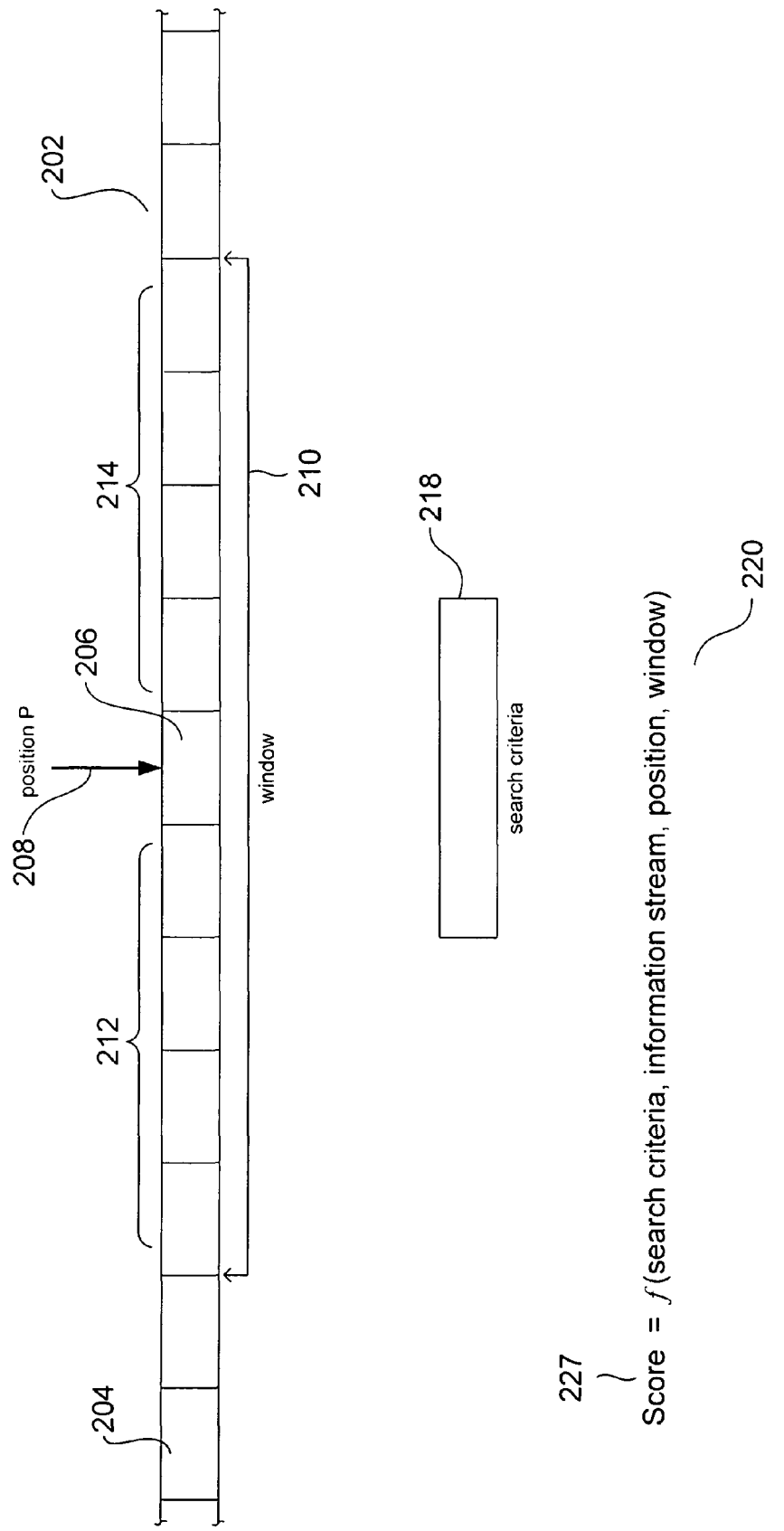
FIG. 2 illustrates the concept of a relatedness function on which many visual interfaces that represent embodiments of the present invention are based.

The present invention is directed to a visual interface that facilitates identification of positions of interest, based on search criteria, within a sequentially ordered information encoding. Sequentially ordered information encodings include text files, video files, audio files, and other types of information that are created, stored, and transferred by computers and other electronic devices as an ordered set of information units for sequential rendering to human users. By contrast, rows and fields within tables of a relational database or lists of information units, such as annotated URLs, that can be reordered and displayed in various orders, based on search criteria, are not sequentially ordered information encodings, although both types of information may ultimately be stored in computer files as an ordered sequence of bytes.

FIGS. 1A-C illustrate sequentially ordered information encodings. FIG. 1A shows a generalized sequentially ordered information encoding. The information encoding comprises an ordered sequence 102 of information units, including information unit 104. The location of any particular information unit in the ordered sequence of information units can be described by a position within the ordered sequence of information units. In FIG. 1A, the position is represented by a horizontal position axis 106 parallel to the ordered sequence of information units 102. A position can be expressed as an offset, in information units, as an index, in temporal units, and in many other ways.

Most types of electronically encoded information can be considered to be ordered sequences of information units. For example, most files stored within computer systems can be considered to be arrays of bytes, with the position of each byte indicated by an index or byte offset from the beginning of the file. In many cases, the contents of such a file can be considered to be an ordered sequence of higher-level information units. For example, a compressed audio file is generally stored as an ordered sequence of bytes. However, at a higher level, the contents of an audio file may correspond to a sequence of spoken words that together comprise a narrative. At a higher level, each syllable, or word, in the narrative may be a fundamental information unit, with the entire narrative comprising an ordered sequence of syllables or words. At a still higher level, the narrative may be considered to be an ordered sequence of sentences. Thus, the information unit that is sequentially ordered in an information encoding may be of fixed size, such as a byte, or may be of varying sizes or lengths, such as words or sentences. Furthermore, the position of an information unit within an information encoding may be specified in a variety of different ways, depending on the type of information encoding, and the level of abstraction at which positions are related to information. For example, in a digital audio recoding, the position of a word within a narrative or notes within a musical composition may be more conveniently expressed as a millisecond offset from the beginning of play of the audio recording to play of the word or musical note. In a text file, positions of words may be conveniently expressed as offsets, in words or characters, from the beginning character of the text.

FIG. 1B illustrates rendering of a page within a page-based, digitally encoded text document. Depending on the application program rendering the document, a user may be able to stream the document page-by-page, move a cursor through a displayed text page character-by-character, advance the cursor by some number of characters in either a forward or backward direction, page forward or backward by some number of pages, and search for the occurrence of particular words or phrases using a search tool. However, should a user of an application program that renders the encoded document as displayed pages wish to find and access a discussion of a particular character's childhood, the user might either search the novel, by accessing discrete pages, in order to find a discussion of the character's childhood, perhaps by searching within initial parts of the novel in which the user expects the discussion to reside, or the user might employ word-based search tools to locate pages containing words and/or phrases that the user would expect to find in a discussion of the character's childhood. For a complex novel, it would be expected that such a search may involve accessing and at least partially reading many pages before the desired discussion of the character's childhood is located.

FIG. 1C illustrates rendering of a video clip by a media player incorporated in, or accessed by, a web browser or application program that displays a web-page-based video-clip viewing interface on a computer, or rendering of the video clip by a portable electronic device that displays a video-clip-rendering GUI. Video is displayed within a video screen 110 provided by the web-page-based video-clip viewing interface or portable device GUI 112. The device interface or web page provides a text-entry window 114 that allows a user to input text to serve as search criteria for finding desired videos to view, displaying the results of each search in a results window 116 that can be scrolled by scroll-up 118 and scroll-down 120 buttons and from which a video can be selected for display. In addition, a progress display 122 displays, to a user, an indication of the current position within a video clip being displayed during rendering of the video clip, with the entire length of the video clip represented by horizontal bar 124 and the current position within the video clip indicated by the position of a position indicator 126 with respect to the horizontal bar. In FIG. 1C, the position indicator 126 indicates that the currently displayed video frame occurs at a position 25% of the way through the video clip. The user interface provides a start/stop button 128 for starting and stopping video clip display, as well as a backward-advance button 130 and forward-advance button 132 that allow the user to seek different positions within the video clip without watching intervening frames. Should a user desire to view a particular play within a sports contest represented by a video clip, a user would either need to watch the entire video, from start to finish, or employ the advance buttons 130 and 132 and start/stop button 128 in order to explore the content at various positions within the video clip in order to locate the desired play, much as the user of the novel-rendering application, discussed with reference to FIG. 1B, would need to access and at least partially read various pages within the novel to find a particular passage.

Embodiments of the present invention are directed to a visual interface to facilitate searching for locations, or positions, of desired content, and accessing the desired content at the identified positions, within a sequentially ordered information encoding, such as an encoded video signal, as discussed with reference to FIG. 1C, above. In certain embodiments of the present invention, the visual interface relies on one or more relatedness functions or routines that provide a score, or relatedness metric, that indicates the relatedness of the content within a context about a specified position within the sequentially ordered information encoding with respect to specified search criteria. FIG. 2 illustrates the concept of a relatedness function on which many visual interfaces that represent embodiments of the present invention are based. In FIG. 2, a portion of the sequentially ordered information encoding 202 is shown as an ordered sequence of information units, including information unit 204. In FIG. 2, the information units are shown as having a single, fixed size, although, in different types of information encodings, the basic information unit may have a variable size, as discussed above. As also discussed above, the position of each information unit within the information encoding may be identified by a numerical value, such as index or offset. An offset may be expressed in information units or information components, time, as a percentage of the entire time for rendering the information encoding, or in of numerous other types of units. In FIG. 2, information unit 206 is identified by a position value p 208.

In many cases, a relatedness function or routine considers a window, or context, of information units preceding and following a particular information unit. In FIG. 2, for example, the window, or context 210 about information unit 206 specified by position p 208 includes information unit 206, the preceding four information units 212, and the following four information units 214. The dimensions of windows, or contexts, may vary with respect to relatedness functions, the type of encoded information, the position p within the information encoding, and with respect to other implicit characteristics and implicit or explicit parameters. Although the window shown in FIG. 2 is symmetrical with respect to the information unit 206, windows, or contexts, may be asymmetrical or one sided. In certain cases, the window, or context, may include only the information unit and a specified position.

In addition to a specified position, a context or window, and a particular information encoding, a relatedness function or routine generally employs some type of search criterion in order to assign a relatedness metric to a particular position within the information encoding. In FIG. 2, a text-entry window 218 represents a text-based search criterion with respect to which a relatedness routine or function may assign a relatedness metric, or score, to each position p within a fully-text-based or partially-text-based information encoding. Many other types of search criteria may be used, including graphical or shape-based search criteria for searching for objects in a sequence of video frames.

In certain cases, a relatedness function may also employ a window in time, or in successive calls to the relatedness function, so that discrete calls made with specific search criteria are cumulative, over time. In other words, the relatedness function may take into consideration not only the currently supplied search criterion, but also search criteria previously specified in preceding invocations of the relatedness function.

As one example, consider the video-clip rendering interface discussed in FIG. 1C. In general, a video clip comprises a sequence of video frames as well as an audio soundtrack. The audio soundtrack may be decompressed, transcribed into natural language, and correlated, word-by-word, with the particular video frame displayed when each word is rendered. Positions within the video clip may be specified by millisecond offsets from the beginning of the video clip as the video clip is played to a user, and search criteria may be words or phrases that may be related to words or phrases that occur within the transcribed audio stream. As shown by expression 220 in FIG. 2, the relatedness function or routine can be considered to be a function that takes a specified search criteria, a specified information encoding, a specified position within the information encoding, and, optionally, the characterization of the window or context about the specified position as parameters, and returns a numerical score 222 that represents the relatedness of the content at the specified position within the information encoding to the search criteria.

Figure 3:
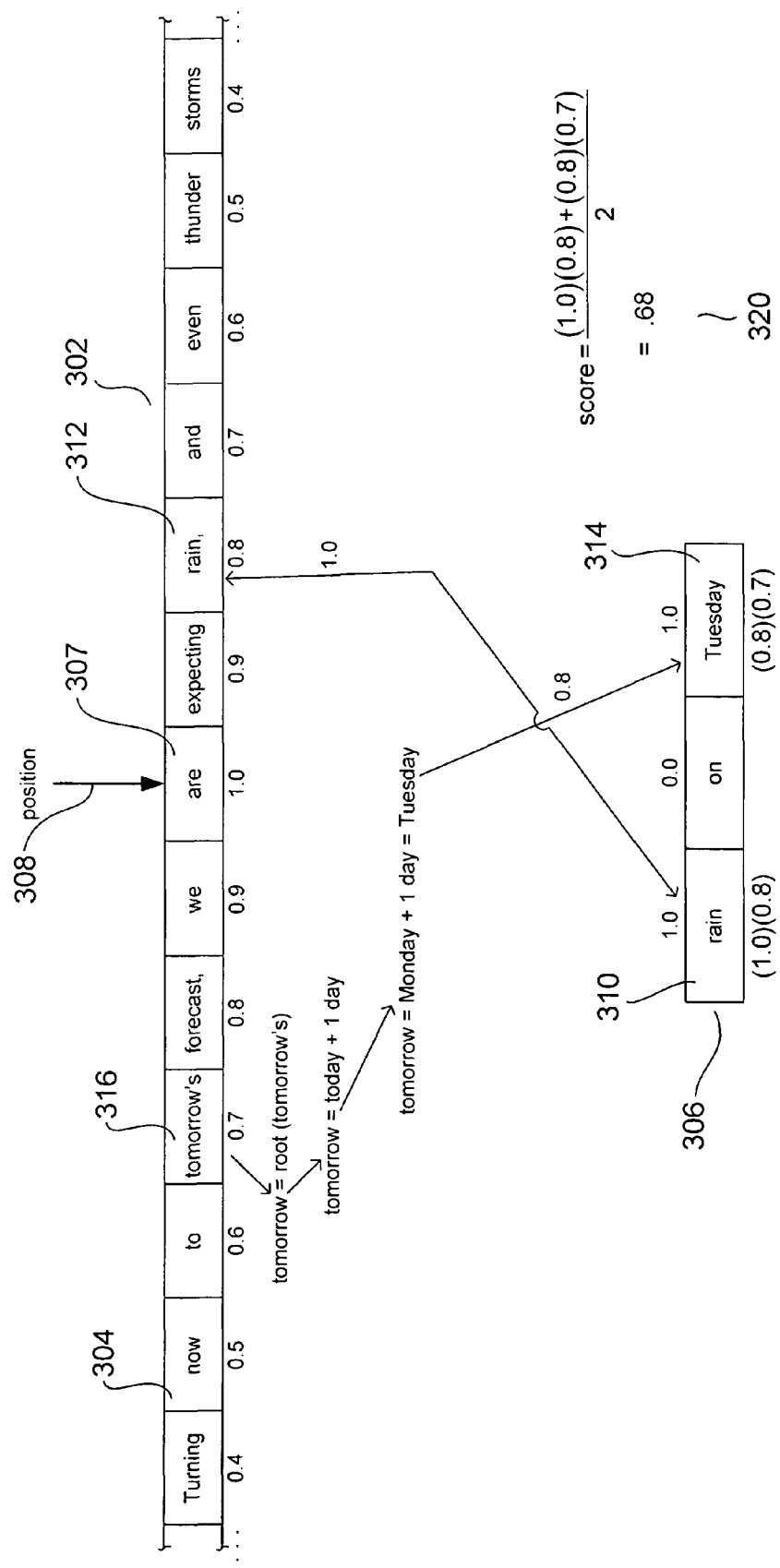
FIG. 3 illustrates an exemplary relatedness function that may be used for searching text-based information encodings with respect to text-based search criteria.

FIG. 3 illustrates an exemplary relatedness function that may be used for searching text-based information encodings with respect to text-based search criteria. As shown in FIG. 3, the information encoding 302 comprises a sequence of words, such as the word "now" 304. The search criteria 306, in the exemplary interface shown in FIG. 3, comprise the three-word phrase "rain on Tuesday." The exemplary relatedness function considers a window, or context, of 19 words centered about a word 307 corresponding to a specified position 308 within the information encoding. The relatedness function employs natural-language processing algorithms in order to relate words that occur in the search criteria to the words, or words related to the words, within the 19-word window, or context, surrounding and including the word at the specified position. In the example shown in FIG. 3, the word "rain" 310 within the search criteria occurs 312 within the window, or context, about specified position p. The word "Tuesday" 314 within the search criteria is related, by a series of rules or transformations, to the word "tomorrow's" 316 within the currently considered window, or context. The relatedness function computes a score 320 as the numerical average of intermediate scores computed for each word in the search criteria for which a matching word or related word is found in the window, or context. Each intermediate score is obtained by multiplying a position-offset factor with a closeness-of-match factor. Thus, in the case shown in FIG. 3, a score of 0.68 is computed for position 308 with respect to search criteria 306. The exemplary relatedness function illustrated in FIG. 3 returns scores that range from 0.0 to 1.0. The exemplary relatedness function is one example of an essentially unlimited number of possible relatedness functions that may be devised in order to generate a score or relatedness metric for positions within information encodings with respect to various types of search criteria. Video-only relatedness functions, for example, might search video frames for shapes, sub-images, color patterns, or for other visually specified search criteria.

Figure 4:
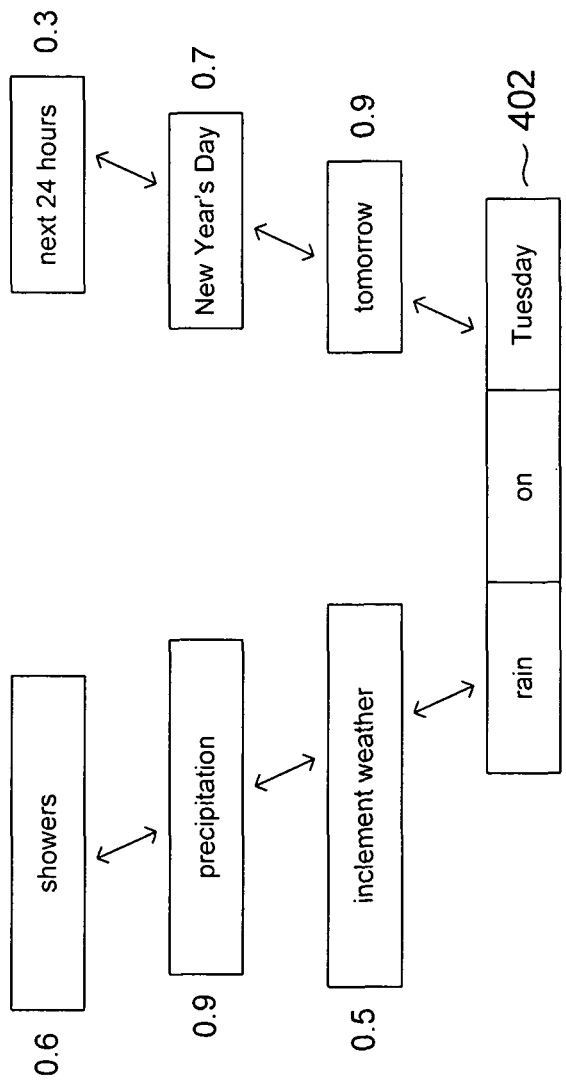
FIG. 4 illustrates words and phrases related to words in a specified text-based search criterion.

In addition to a numerical relatedness score, relatedness functions or routines, or other accessory functions and routines, may also return lists of words, phrases, or other types of information related to specified search criteria. FIG. 4 illustrates words and phrases related to words in a specified text-based search criterion. In FIG. 4, the search criterion 402 is the phrase "rain on Tuesday" used as the search criterion in FIG. 3. The natural-language-processing methods employed by the relatedness function described with reference to FIG. 3 can also be used to return words and phrases related to words within the search criteria, each returned word or phrase annotated with a numerical indication of the degree of relatedness to the search-criteria word. For example, as shown in FIG. 4, the natural-language processing methods may identify the words and phrases "showers," "precipitation," and "inclement weather" as words and phrases related to the search-criterion word "rain." When non-text-based search criteria are employed, other types of information related to search criteria may be identified. For example, when graphical search criteria are employed to search for related objects in photographic images or video frames, graphics-processing tools may return rectangles and perhaps other polygons as related shapes to a square shape used as a search criterion.

FIGS. 5A-G illustrate an exemplary relatedness function and various operations that may be performed on, or incorporated within, a relatedness function. As discussed with reference to FIG. 2, a relatedness function, or routine, can be considered to be a function that takes four parameters and returns a numerical relatedness score:

$$score = f(sc, is, p, w)$$

where
- sc = search criterion;
- is = information within which to search;
- p = position; and
- w = window.

Repeated calls to the function, over a range of position values, can be used to construct a graph or visual display of the relatedness function. In other words, as shown in FIG. 5A, repeated calls to the function $f(sc,is,p,w)$ for a range of position values p, at fixed intervals from one another, produces a step function, or histogram-like function, such as the relatedness function plotted in FIG. 5A. In FIG. 5A, the horizontal axis 502 represents position and the vertical axis 504 represents the value of a relatedness metric or score computed with respect to a position, a specified search criterion, a specified information encoding, and, optionally, specified window characteristics. For example, the function $f(sc,is,p,w)$ may be a relatedness function that relates text-based search criteria to the transcription of an audio-track component of a video signal, and may be called for specified positions separated by a 40-millisecond interval to produce the step function shown in FIG. 5A. Were the relatedness function shown in FIG. 5A displayed to a user, the user could identify, by inspection, a position 506 at which content related to the specified search criterion can most likely be found.

The relatedness function can be considered to return a relatedness value for any specified position. If the interval between specifiable positions is greater than the underlying information units referenced by position, so that, for example, each specified position corresponds to two or more information units, then the number of information units that correspond to a particular position represents a smallest window, or context, used by the relatedness function to compute a relatedness score. In the example calculation sown in FIG. 2, for example, a window of 19 words is used to compute the score at any particular position p. The computed relatedness metric thus considers all information units within a window, or context, in computing the relatedness metric for a particular position. In the case that the smallest interval between specifiable positions is larger, in information units, than a single information unit, then the relatedness function generally computes a relatedness metric for a window, or context, of sufficient size to span the smallest interval between two positions. The computation may involve choosing a maximum score from among scores computed for each information unit in the window, or may involve an averaged score, or, alternatively, may involve computing the relatedness metric as a function of two or more information units within the window. In the case that the smallest interval between specifiable positions is equal to a single underlying information unit, then a single information unit is the smallest possible window that can be used by the relatedness function. The interval between specifiable positions may be constrained to be no smaller than a single information unit, or, should the interval be allowed to be smaller than a single information unit, then the relatedness function would need to employ a sufficiently large position-based window, or context, to include at least one information unit.

Figure 5B:
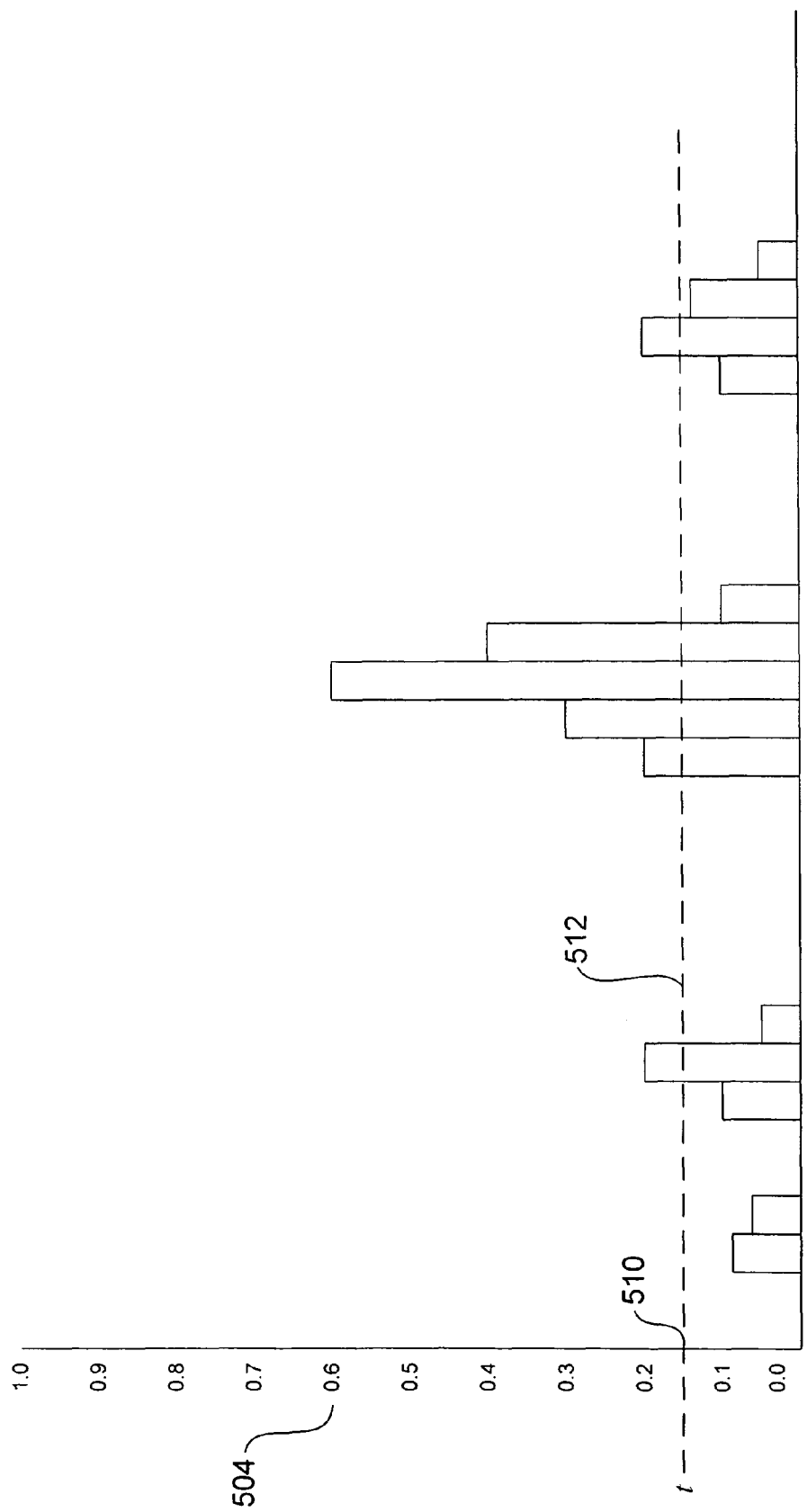

FIGS. 5B-C illustrate a thresholding operation. FIG. 5B shows the same step function as shown in FIG. 5A. In FIG. 5B, a relatedness-metric threshold $\tau$ 510 is established at 0.15 units along the relatedness-metric axis 504. This threshold is applied to the entire step function, as represented by the dashed line 512 in FIG. 5B. The threshold value $\tau$ represents a minimal significance of relatedness. The threshold may be a parameter to the relatedness function, and may be specified by a user or by an application program in order to simplify the relatedness function results in order to facilitate quick and efficient identification of desired locations within an information encoding. In FIG. 5C, the relatedness function shown in FIGS. 5A-B is redisplayed by using the threshold value 0.15 as the threshold significance for displaying relatedness results, and by renormalizing relatedness values between 0.15 and 1.0 to the range 0.0-1.0. In other words, only those relatedness values that rise above the threshold level (512 in FIG. 5B) are displayed in FIG. 5C, and the above-threshold range 0.15-1.0 is expanded to 0.0-1.0 by renormalization. Thus, when the relatedness function supports thresholding, the relatedness function can be specified as:

$$score = f(sc, is, p, w, \tau)$$

where $\tau$ = threshold.

Figure 5E:
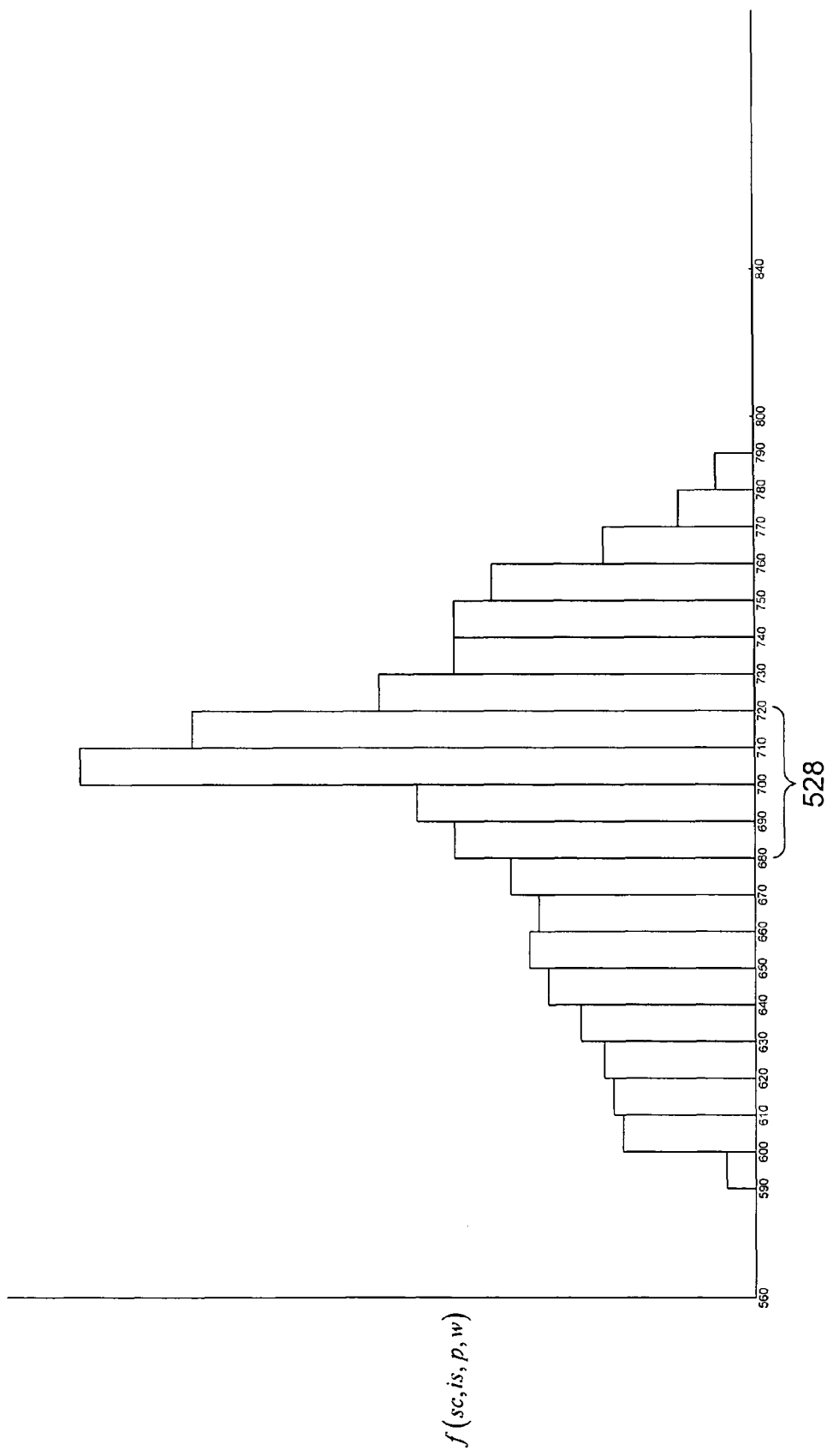

FIGS. 5D-F illustrate rescaling of a particular region of a relatedness function. FIG. 5D shows the same relatedness function as shown in FIGS. 5A-B. However, in FIG. 5D, a sub-domain 514 of the position values, between a position at 560 milliseconds 516 and a position at 840 milliseconds 518, has been demarcated by dashed vertical lines 520-521. In FIG. 5E, the sub-range (514 in FIG. 5D) is expanded and redisplayed. Expansion is carried out both by expanding the sub-domain to equal the size of the originally displayed domain and by computing relatedness metrics at a finer granularity than positions are sampled in the originally displayed relatedness function. Thus, the single, highest peak 526 in FIG. 5D corresponds to region 528 in FIG. 5E. By visually expanding a sub-domain and by sampling at finer granularity, a rescaling of a relatedness function that reveals greater detail within a selected sub-domain is produced.

Figure 5G:
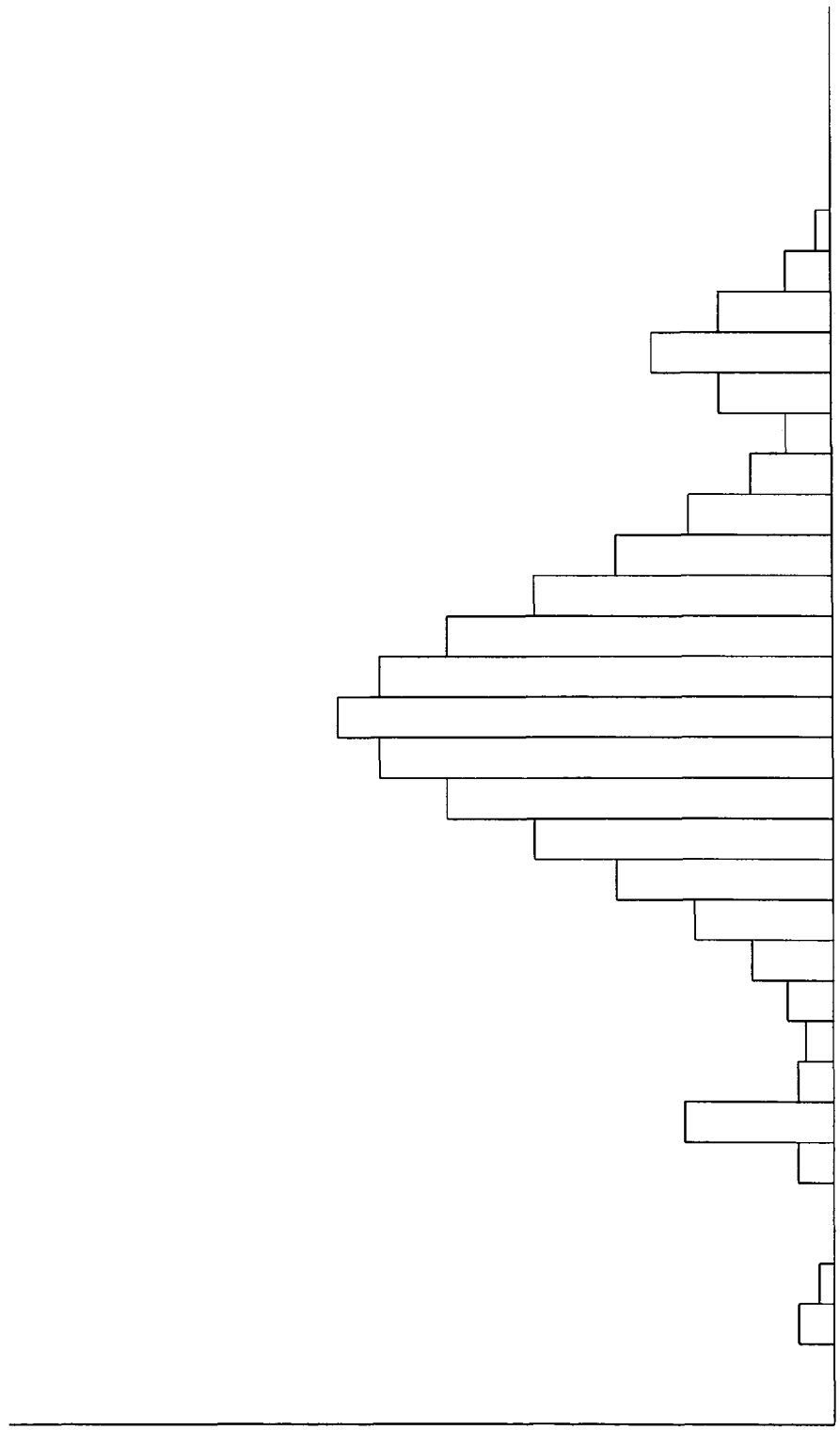

FIGS. 5F-G illustrate smoothing of a relatedness function. FIG. 5F shows the same relatedness function as shown in FIGS. 5A-B and 5D. In addition, a Gaussian curve has been fitted to each peak of the function within the displayed domain. For example, Gaussian curve 540 has been fitted to the peak corresponding to columns 544-548. A Gaussian-like curve can be generated as:

$$y = b[e^{-(p-p_0)^2 a}]$$

where
- $p_0$ = a position constant;
- p = position variable;
- a = constant; and
- b = constant.

For example, the constant b can be chosen as the relatedness value, or relatedness metric, at a position $p_0$, representing a local maximum of the relatedness function, and the constant a can be selected so that the Gaussian curve is greater than each relatedness metric corresponding to positions p close to the local-maximum position $p_0$. Although Gaussian-like curves are popular choices for smoothing functions, many additional parametrically specified functions can be alternatively used for smoothing. The relatedness function can then be redisplayed, as shown in FIG. 5G, with column heights adjusted to equal the y-coordinate of respective positions along the Gaussian-like smoothing curves. Relatedness-function smoothing may, in certain cases, provide a more pleasing and intuitive representation of the relatedness of content at specific positions with respect to search criteria for information encodings. While the Gaussian-like curves shown in FIG. 5F are symmetrical, non-symmetrical curves can also be used. For example, in the above expression, the multiplier b may alternatively be a variable, and vary as a function of p, leading to a family of asymmetrical curves that may be useful for relatedness-function smoothing, allowing, for example, a more gradual relatedness-metric fall off following a peak relatedness-metric value than the initially steep rise in relatedness-metric value leading up to the peak value.

A generalized relatedness function may include many additional parameters. FIG. 6 shows a table of parameters, and parameter abbreviations, for various different parameters that may be used to specify specific relatedness functions for use in implementing visual interfaces that represent embodiments of the present invention. These parameters may be explicit function parameters, as shown in expression 602, or, by contrast, only a subset of the parameters may be explicit, and the remaining parameters may implicitly specify, or describe, a particular relatedness function, as shown in expressions 604 and 605. In yet additional embodiments of the present invention, a relatedness function may only require a subset of the parameters listed in FIG. 6. In expressions 602 and 604, a relatedness function is called once for a range of positions specified by a start-position parameter 606, an end-position parameter 607, and a position increment 608. The scores computed for each position in the range of positions placed into a score buffer 610, specified as a parameter to the function. Alternatively, relatedness function may directly return a single score for a single specified position, as in expression 605. Additional parameters include: (1) the type of information encoding to be searched; (2) the type of search criteria to be used for determining relatedness at specified positions; (3) the type of relatedness score to be returned; (4) a subject-matter domain, or multiple subject-matter domains, to which the encoded information and search criteria are related; (5) the degree of smoothing to employ; (6) the particular search criteria to use for computing relatedness metrics, or scores; (7) the start position, end position, and position increment within a range of positions for which relatedness metrics are to be computed; (8) characteristics of one or more windows or contexts to employ for computing relatedness metrics; (9) specification of one or more thresholds to employ computing relatedness metrics, or scores; and (10) an identifier or handle for the particular information encoding for which relatedness metrics are to be computed at one or more specified positions. In general, there may be, alternatively, multiple parameters used to specify what is shown to be a single parameter, in the above table, or multiple parameters in the above table may be coalesced together as a single parameter. The table is meant to illustrate exemplary parameters that may be used for a relatedness function, but is not meant to in any way constrain or limit the numbers and types of parameters that may be employed, for any particular relatedness function.

In various embodiments of the present invention, a visual interface that includes a representation of a relatedness function computed over a range of positions with respect to a user-specified search criterion is displayed to the user, as part of the GUI for encoded-information rendering, to enable a user to quickly identify and access those portions of an information encoding most relevant to the specified search criterion. In certain embodiments of the present invention, the relatedness function is displayed as a heat map or heat-map-like display feature. A heat map represents the magnitudes of relatedness metrics, or scores, at each position within a range of positions by a visually distinguishable display characteristic, such as brightness level, shading, or color.

Figure 7:
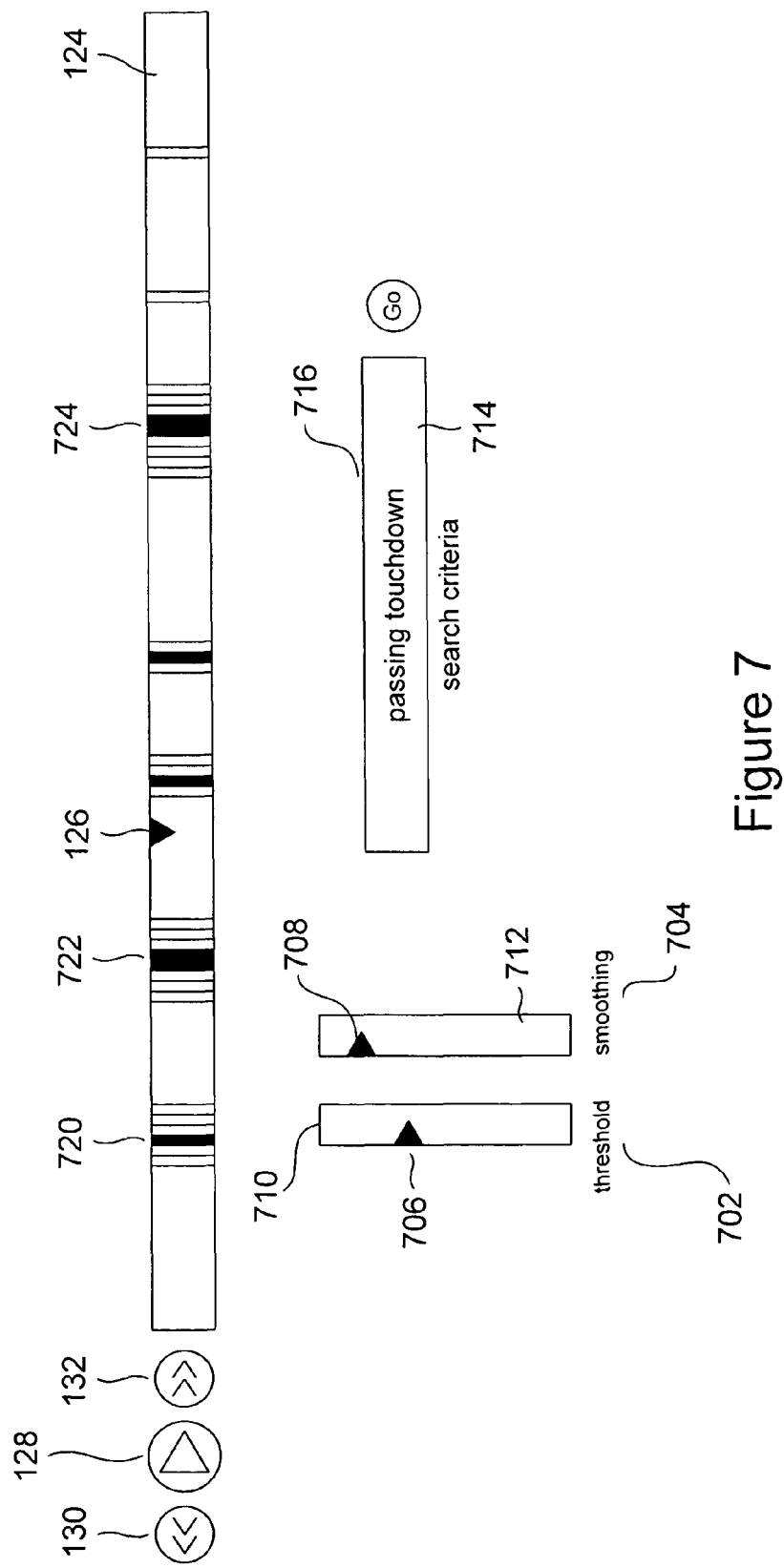
FIG. 7 illustrates one embodiment of the present invention.

FIG. 7 illustrates one embodiment of the present invention. FIG. 7 shows the navigational buttons and progress display of the video-clip rendering GUI shown in FIG. 1C, along with additional visual-interface features. The backward-advance 130, forward-advance 132, and start/stop 128 buttons have functions in the visual interface identical to the functions described for these interface features of the video-clip-rendering GUI shown in FIG. 1C. The progress display 124 and 126 also has an identical function to that of the video-clip-rendering GUI shown in FIG. 1C, with the exception that, rather than showing a simple, solid-color horizontal bar to represent the extent of the video clip, as in FIG. 1C, a heat-map-like representation of a relatedness function is superimposed within the horizontal bar 124 of the progress display. In this heat-map-like representation, darker shading represents relatedness metrics, or scores, of larger magnitude. The visual interface also includes two parameter-specification features 702 and 704 that allow a user to specify, by sliding indicator buttons 706 and 708, respectively along columns 710 and 712, the degree of thresholding and smoothing to employ when computing the relatedness metrics, or scores, for positions within an information encoding with respect to a search criterion 714 specified by the user within a search-criteria-entry window 716. In the example shown in FIG. 7, the horizontal bar 124 of the progress-display component represents the extent of a video clip, and one can easily determine, by visual inspection of the heat map superimposed within the horizontal bar 124, that content related to the currently-specified search criterion may be most probably found at positions 720, 722, and 724. A simpler visual interface that represents an embodiment of the present invention may include only a heat-map-like representation of a relatedness function, and may rely on selection features of an existing GUI for inputting search criteria. More complex visual interfaces that represent embodiments of the present invention may include additional selection features to allow additional parameters that control the display of the visual interface and computation of the relatedness function to be specified by a user, including subject-matter domain, for example. Of course, as with all visual interfaces, there are many different ways, and types of selection and input features, that may be used to provide user input of parameters, search criteria, and other input data. In addition, a visual interface may support multiple methods for inputting any particular input data. For example, in the visual interface shown in FIG. 7, a user may be able to select a position at which to start or resume rendering of the information encoding by using the backward-advance and forward-advance buttons, by moving the position indicator, or by inputting a mouse click after moving a pointer to the position as represented by a location within the horizontal bar of the progress-display component.

As discussed above, the heat map may use differences in shading, colors, or other visual cues in order to represent the magnitudes of the relatedness metrics computed for positions within the information encoding represented by the horizontal bar 124 of the progress-display component. For example, a single numeric relatedness metric, or score, ranging from 0.0 to 1.0, can be used to assign a grayscale value to each column in the heat map corresponding to each position or, more exactly, to each increment, or interval, between and including two positions. Alternatively, the score returned by the relatedness function may specify a hue, a luminance value, both a hue value and a luminance value, or other color-related parameters that control the color displayed within each interval of the heat map. In one embodiment of the present invention, a spectrum of colors ranging from blue to red represents a range of relatedness values from 0.0 to 1.0. There are many alternative visual encodings of relatedness functions that may be employed in alternative visual representations of relatedness functions. In certain embodiments, a user may tailor the heat-map-like display by selecting the correspondence between relatedness metrics and colors or grayscale values.

Figure 8:
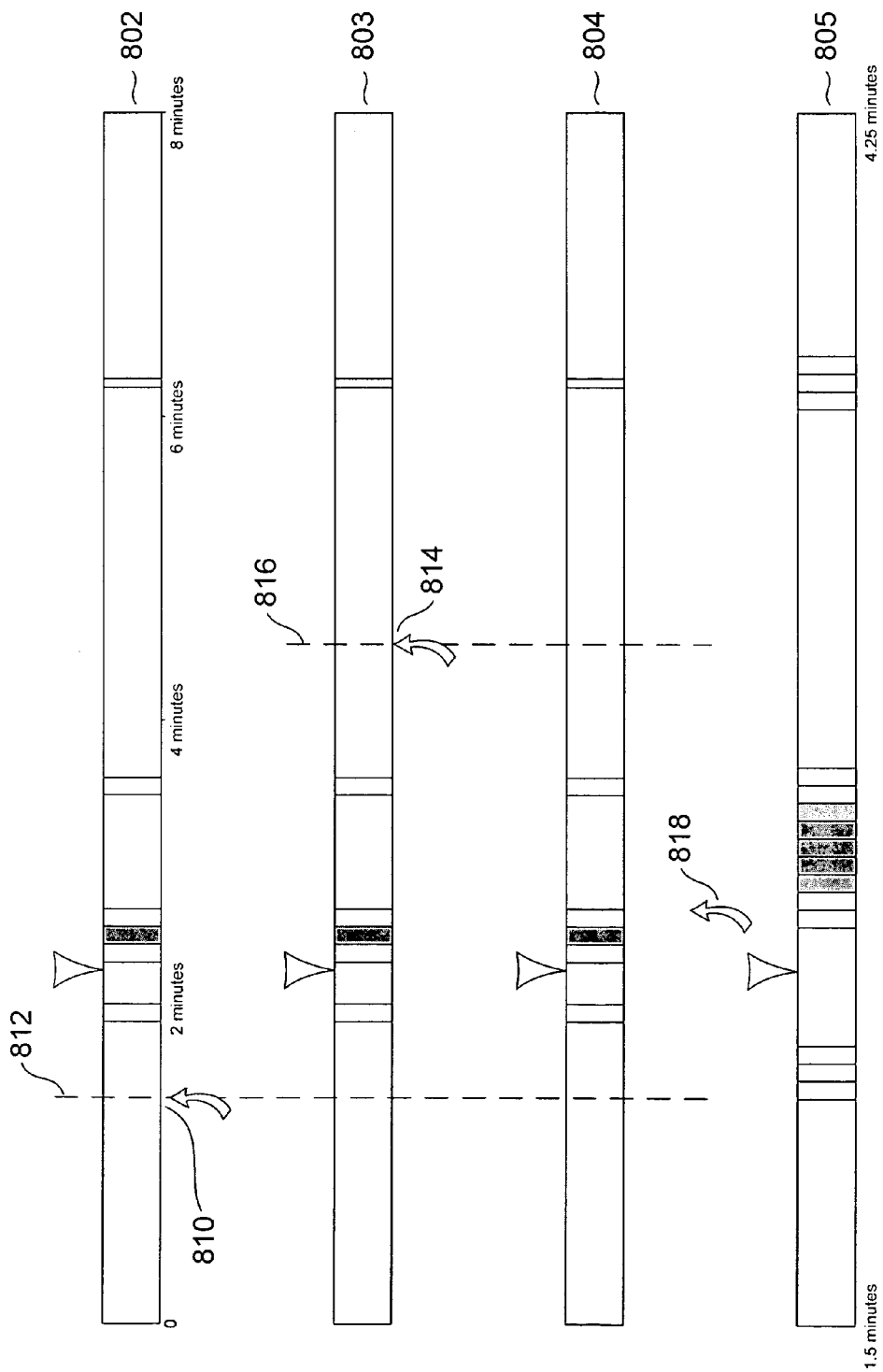
FIG. 8 illustrates a rescaling operation according to one embodiment of the present invention.

The various operations that can be incorporated into, or applied to, relatedness functions, discussed above with reference to FIGS. 5A-G, can be invoked through the visual interface that represents one embodiment of the present invention. FIG. 8 illustrates a resealing operation according to one embodiment of the present invention. In FIG. 8, four horizontally displayed heat maps 802-805 represent different stages of heat-map display during the resealing operation. First, a user moves the cursor and inputs a cursor click to a left-hand position 810 of the heat map. This operation invokes a displayed vertical line 812. Next, the user moves the cursor and inputs a mouse click to a second, right-hand position 814, invoking display of a second vertical line 816. Then, the user inputs a mouse click within the sub-region defined by the two vertical lines 818 to invoke a resealing operation, in which the sub-region defined by the two vertical lines is expanded to fill the entire horizontal bar 805. Many alternative visual-interface features and user-input protocols may be alternatively employed to specify resealing operations. A similar, but inverse, operation may be used to decrease the resolution of the heat map, in one embodiment by allowing the vertical lines to be created past the end points of the heat map. Of course, any particular operation needs to be differentiated from other operations, in time, cursor position, input needed to launch the operation, and/or in other ways, so that input is not ambiguous, and one or more distinct input patterns correspond to each operation.

Figure 9:
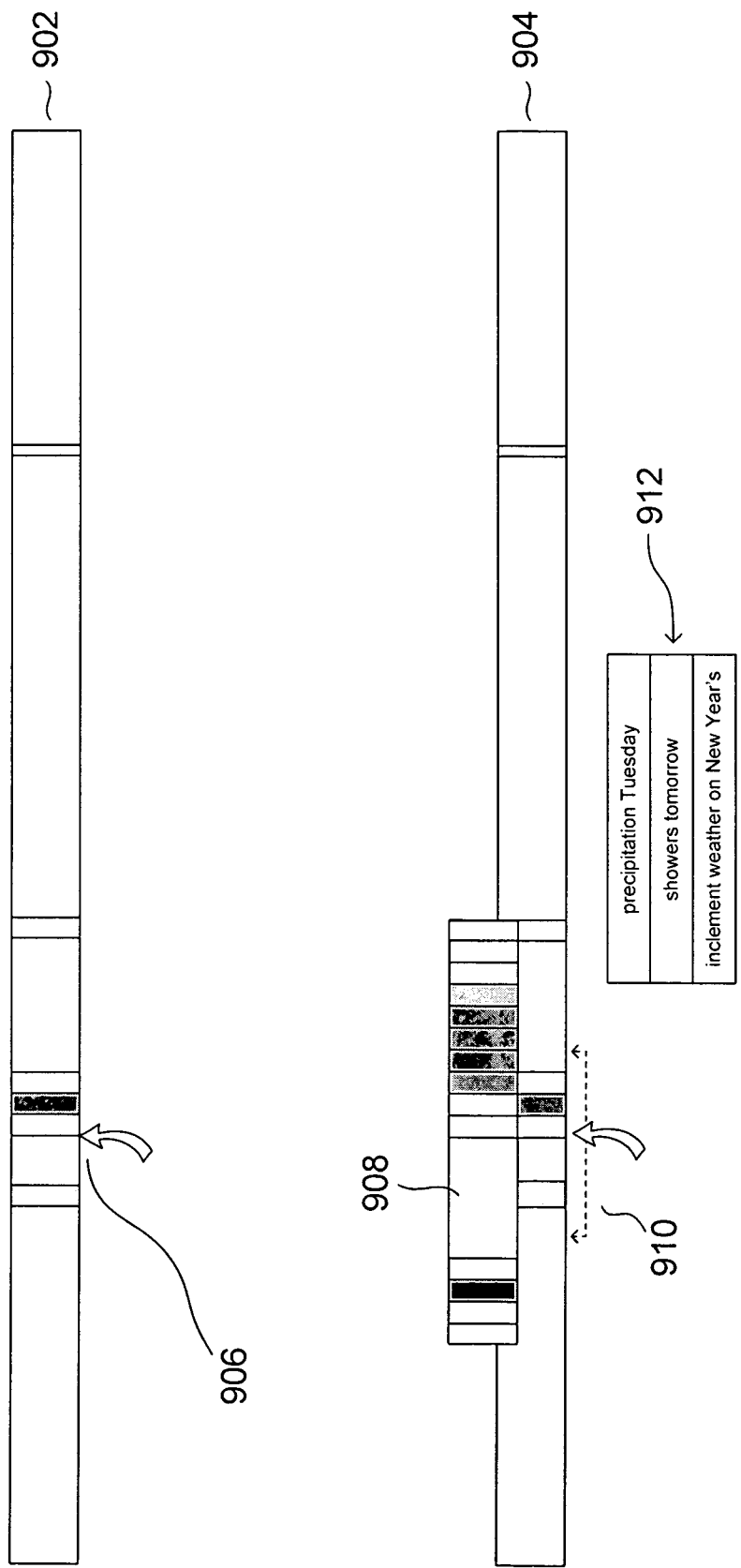
FIG. 9 illustrates invocation of local rescaling and related-search-criteria display by a visual interface that represents one embodiment of the present invention.

FIG. 9 illustrates invocation of local rescaling and related-search-criteria display by a visual interface that represents one embodiment of the present invention. FIG. 9 includes two horizontally displayed heat maps 902 and 904 that represent different stages during invocation of local rescaling and related-term display. First, a user directs a cursor, via mouse control, to a particular position within the heat map 906. Detecting positioning of the cursor within the heat map, a heat-map-generator application then computes and displays a higher-resolution heat map 908 corresponding to a window 910 about the current position of the cursor, much as a reader may use a magnifying glass to magnify a small portion of the printed page of a book. In certain embodiments of the present invention, a user may then navigate the cursor within the higher-resolution heat map in order to select particular positions from which to start or resume rendering of the encoded information represented by the heat map. Alternatively, the user may move a position indicator to a position within the higher-resolution heat map to specify a position from which to begin or resume rendering of the information encoding. In addition, the heat-map-generation application may display 912 a list of words and phrases related to the currently specified search terms, or, in alternative embodiments, a list of words and phrases within a window about the current position found to be related to the currently specified search terms. For example, as the current position of a cursor within the heat map, correlated with a current position within the information encoding, is moved by user interaction with the visual interface, the list of words and phrases may be updated, to allow a user to explore correlation of the list contents with position. In certain cases, user-directed movement of a cursor or marker within the list of words and phrases may alter the heat map to indicate, to the user, positions at which the words and phrases occur. Of course, for non-text-based search criteria, alternate types of related-search-criteria display would be invoked in alternative embodiments of the visual interface of the present invention.

In the above-described embodiments of the present invention, visual representation of a relatedness function is displayed within an existing progress-display component of a GUI. In alternate embodiments of the present invention, a visual representation of a relatedness function may be incorporated in other GUI features, or may be displayed in one or more features added to an existing GUI. In many embodiments of the present invention, particularly those embodiments incorporated within relatively low-powered, portable devices, information encodings may be extensively pre-processed, remotely, to facilitate computation of relatedness scores. For example, in the video-clip example discussed with reference to FIG. 1C, the audio tracks of available video clips may be decoded, transcribed, and correlated with video-frame display, and the correlated audio transcriptions may be stored as files, or in a database, with appropriate indexing to facilitate subsequent, real-time calculation of relatedness scores with respect to the video clips and with respect to user-specified search criteria. In these cases, a plug-in or other reasonably light-weight client-side implementation may be incorporated within the portable device for communication with a remote server in order to obtain scores remotely computed according to a specified relatedness function with respect to user-supplied search criteria and to control display of the visual interface. Alternatively, heat-map generation, including computation of relatedness scores, may be carried out locally, within a device or local application. In yet additional implementations, preprocessing of information encodings and computation of relatedness scores may be partitioned in both time and location in order to optimally employ computational resources and available time. For example, pre-processing of information encodings may be carried out on a remote server, with appropriately indexed, pre-processed files downloaded to a local application or device for local score computation and display of the visual-representation of a specified relatedness function.

As briefly discussed above, the score, or relatedness metric, computed for a position within an information encoding may be a single, numeric value, often normalized to fall within the range [0.0, 1.0], that can be used to select a grayscale value, brightness, or some other visual-display parameter in a visual representation of a relatedness function. Alternatively, a score may include two or more components, each component corresponding to a different parameter for visual rendering of a portion of a heat map or other visual representation of a relatedness function. For example, a score may include one or more chrominance and luminance values, or other sets of parameters used to specify colors in different color-encoding schemes. The translation of relatedness metrics to color, brightness, or other visual cues is essentially arbitrary, and may be selected by an application program, plug-in, or other routine or software program, or, alternatively, may be selected by a user in order to customize the relatedness-function display to meet a user's tastes and needs.

Figure 10:
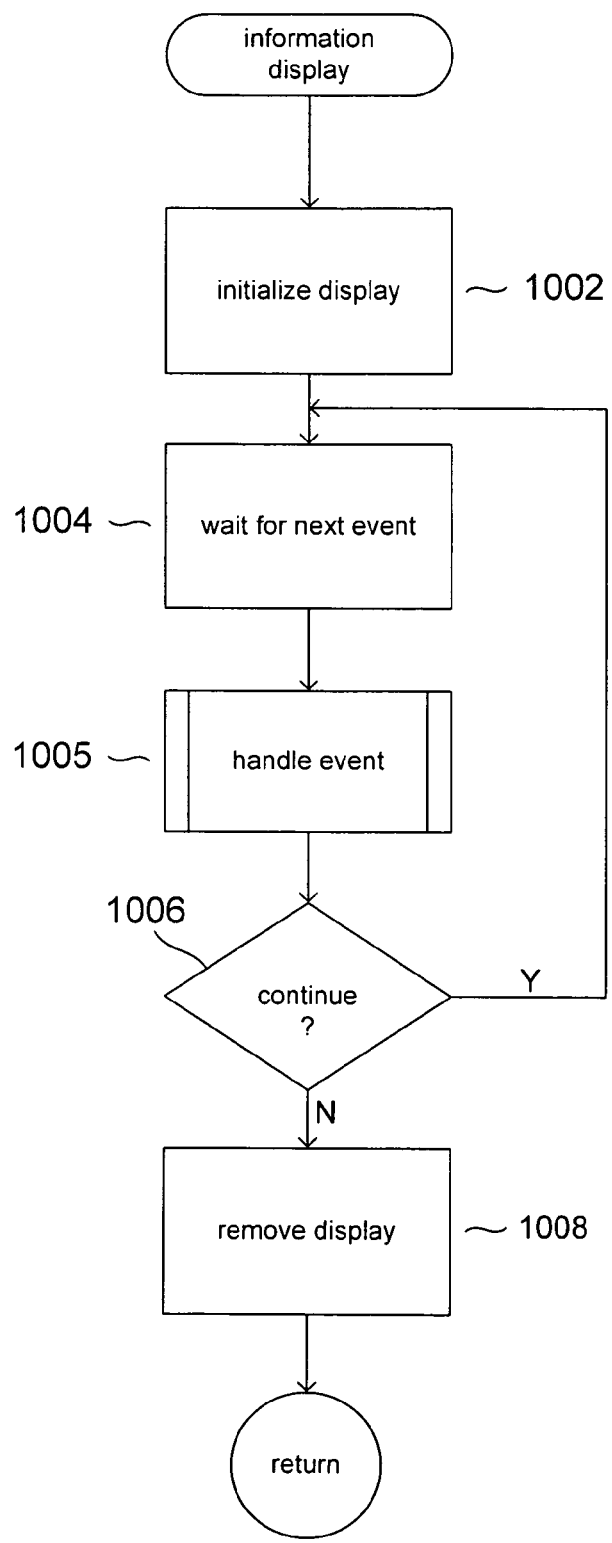
FIG. 10 shows a control-flow diagram that represents an existing information-encoding-rendering GUI.

FIG. 10 shows a control-flow diagram that represents an existing information-encoding-rendering GUI. In step 1002, the interface is initialized. Initialization may involve initializing various internal parameters, displaying the initial state of the GUI, and carrying out other such tasks in preparation for rendering encoded information to a user through the GUI. Then, in a loop comprising steps 1004-1006, the GUI waits for the occurrence of a next event, in step 1004, handles the next occurring event via a call to an event handler, in step 1005, and then, generally, loops back to wait for yet an additional event. Events generally arise as a result of user interaction with a GUI. For example, a user may push the start/stop button to start, stop, or resume rendering of a particular information encoding. Finally, as a result of user input or some other condition, the event loop terminates, and the GUI is deconstructed in step 1008. Many different information-encoding-rendering applications and control programs within information-encoding-rendering devices can be, at a high level, characterized as an iterative event handler.

Figure 11A:
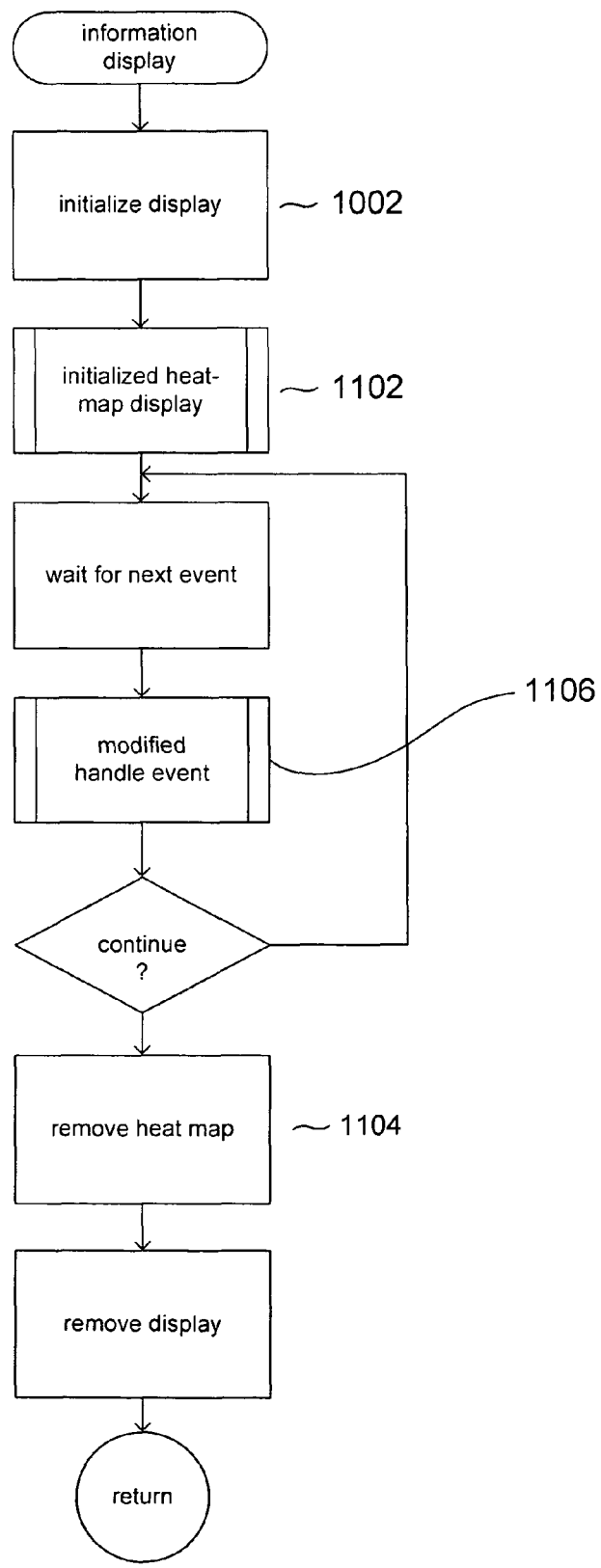
FIGS. 11A-E illustrate modification of the existing GUI, described with reference to FIG. 10, in order to incorporate a visual interface that represents an embodiment of the present invention within the existing GUI.

FIGS. 11A-E illustrate modification of the existing GUI, described with reference to FIG. 10, in order to incorporate a visual interface that represents an embodiment of the present invention within the existing GUI. FIG. 11A shows a control-flow diagram for a highest level event handler, modified with respect to the event handler shown in FIG. 10 in order to incorporate a visual interface that represents an embodiment of the present invention. Comparison of FIG. 11A to FIG. 10 reveals that two additional steps have been added to the control-flow diagram of FIG. 11A, and one step has been modified. First, an additional initialization step 1102 for initialization of a heat-map-like display representing a relatedness function has been added following the existing GUI initialization, in step 1002. Next, an additional deconstruction step 1104 has been added following termination of the event-handling loop for removing the visual interface that includes the heat-map-like representation of a related function. Finally, a modified event handler 1006 has been substituted for the event handler (1005 in FIG. 10) of the existing GUI.

Figure 11B:
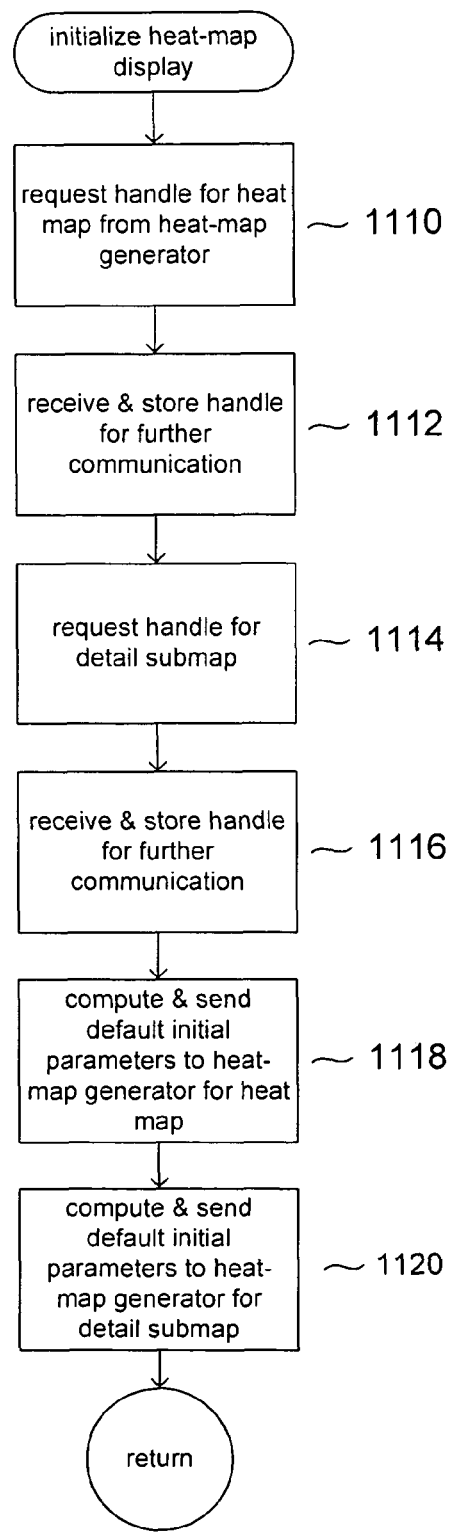

FIG. 11B shows a control-flow diagram for step 1102 in FIG. 11A, in which the heat-map-like display that represents one embodiment of the present invention is initialized. In step 1110, a handle for the heat map is requested from a heat-map-generator entity. As discussed above, the heat-map generator may be a local routine or concurrently executing application or, alternatively, may be an application executing on a remote server or other remote entity. The handle is used to identify the particular heat map that is incorporated in the GUI. Other, concurrently executing GUIs may display other heat maps identified by other handles. Next, in step 1112, the handle received from the heat-map generator is received and stored to facilitate subsequent communication between the GUI and heat-map generator. In steps 1114 and 1116, a handle is requested, received, and stored for a detail sub-map, separate from the heat map, which can be used for the display of a detailed sub-region (908 in FIG. 9). Next, in step 1118, a set of initial parameters, selected from among parameters, such as those shown in FIG. 6, required by the relatedness function used by the heat-map generator to generate scores is computed and sent to the heat-map generator. For example, a particular information-display interface may display only one type of information encoding, and therefore can specify the TIS parameter for the relatedness function during initialization. The heat-map generator can then associate this parameter with the handle for the heat map, so that the parameter need not be communicated to the heat-map generator on each invocation of the relatedness function. Finally, in step 1120, the initialization routine computes and sends initial parameters to the heat-map generator for the detail sub-map.

Figure 11C:
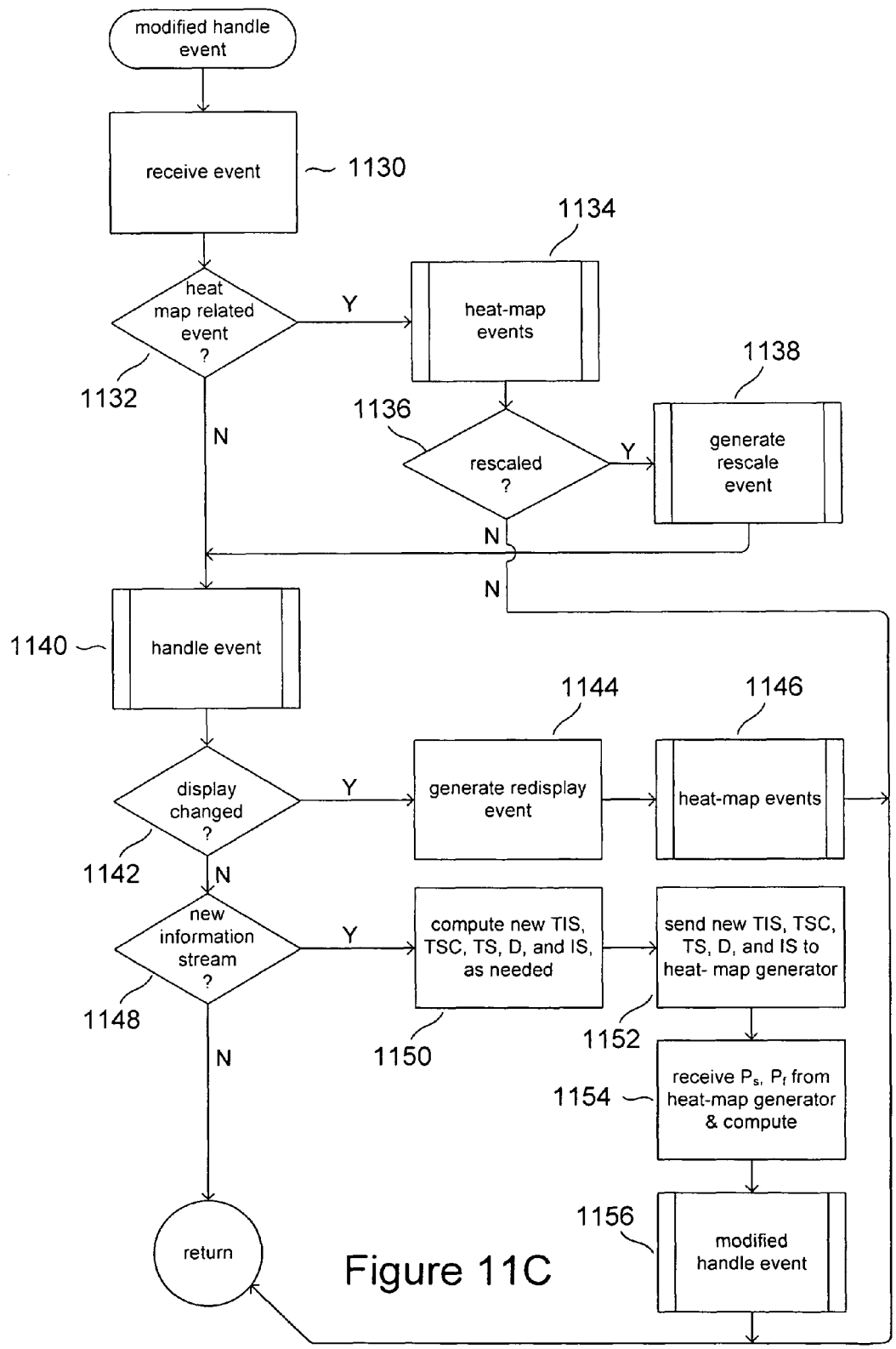

FIG. 11C illustrates one example of a modified event handler, called in step 1106 of FIG. 11A. In step 1130, a next event is received. If the event is a heat-map-related event, as determined in step 1132, then a heat-map-event handler is called in step 1134. If the heat-map-event handler rescales the heat map as a result of event handling, as determined in step 1136, then a rescale event may be generated, in step 1138, in order that the GUI event handler, called in step 1140, carries out appropriate rescaling tasks necessary to obtain correspondence between the heat map and any GUI features in which the heat map is included or on which the heat map is superimposed. For example, if the heat map is rescaled, the GUI may need to recompute and display new indications of positions on a progress display. If the initially received event is not a heat-map-related event and/or if a just handled heat-map event resulted in heat-map rescaling, then the normal event handler for the GUI is called in step 1140. If normal event handling has resulted in alteration of the displayed GUI that requires generation of a new heat map, as determined in step 1142, then a redisplay event is generated, in step 1144, for handling by the heat-map-event handler, in step 1146. Otherwise, if a new information encoding has been selected for rendering as a result of GUI event handling, as determined in step 1148, then new relatedness-function parameters are computed in step 1150, the new parameters are sent to the heat-map-generator entity in step 1152, a new position range may be received from the heat-map generator in step 1154, and the heat map is redisplayed by a call to a heat-map display function in step 1156. Of course, there are an essentially limitless number of ways of modifying a GUI event handler in order to incorporate a visual interface that represents an embodiment of the present invention within a GUI. In the control-flow diagrams of FIGS. 10 and 11A, for example, the event handler is assumed to handle a single event per invocation, with any newly generated events added to a queue for handling subsequent invocations of the event handler. In alternate implementations, an event handler may loop in order to handle all currently queued events. Many of these details are influenced by the particular device, device control program, operating system, web browser, and other underlying components of the GUI.

Figure 11D:
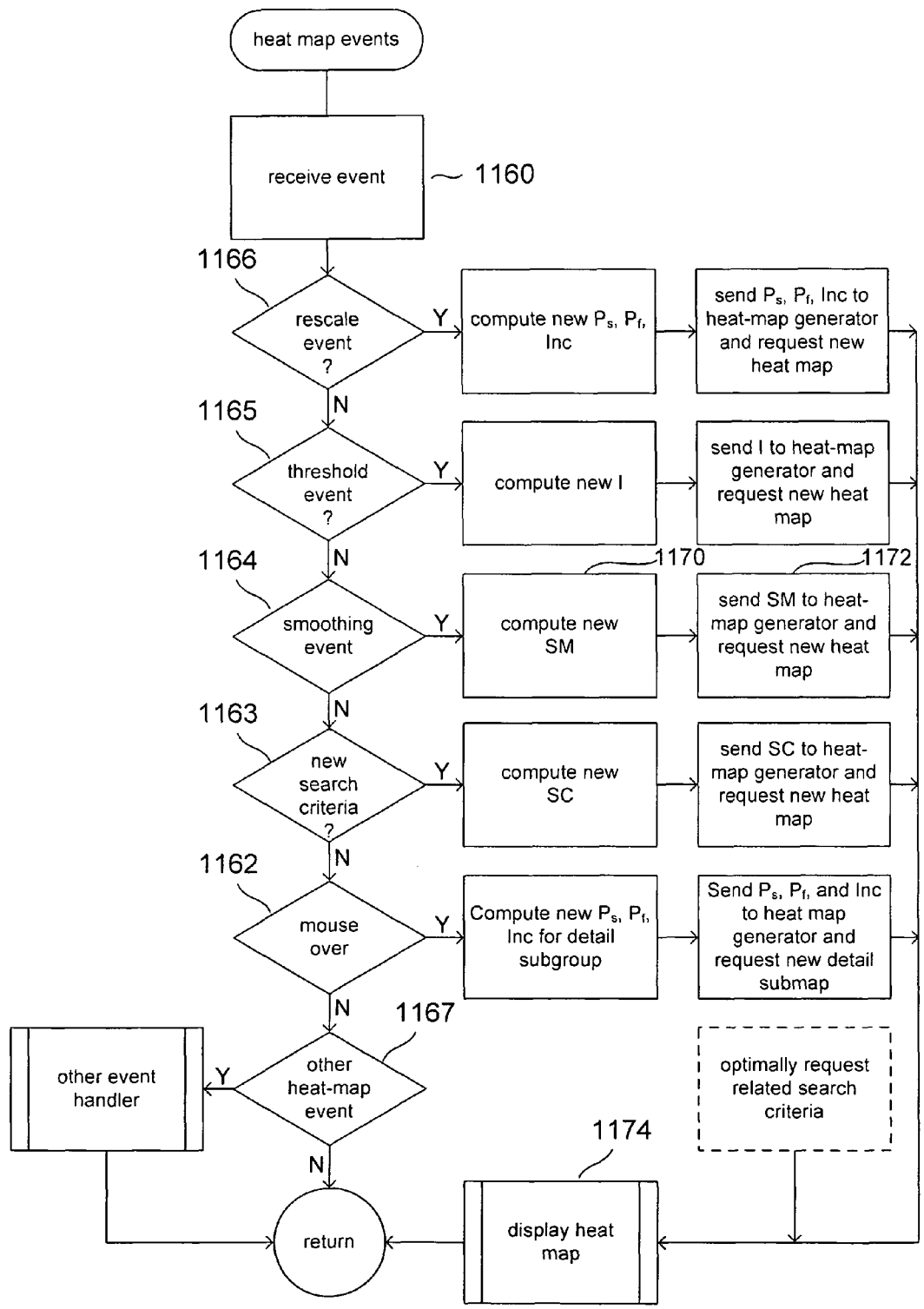

FIG. 11D shows a control-flow diagram for the heat-map-related event handler, called in steps 1134 and 1146 of FIG. 11C. A heat-map-related event is received in step 1160. Then, in a series of conditional steps 1162-1167, the particular type of event is ascertained, and appropriate actions are taken to handle the event. For example, if the event responds to changing the degree of smoothing desired by a user via the smoothing-selection feature (704 in FIG. 7), as determined in step 1164, then a new SM parameter is computed, in step 1170, the new SM parameter is sent to the heat-map-generator entity in step 1172 along with a request to compute new relatedness metrics based on the supplied SM parameter, and the heat map is recomputed and redisplayed via a call to the display-heat-map routine in step 1174.

Figure 11E:
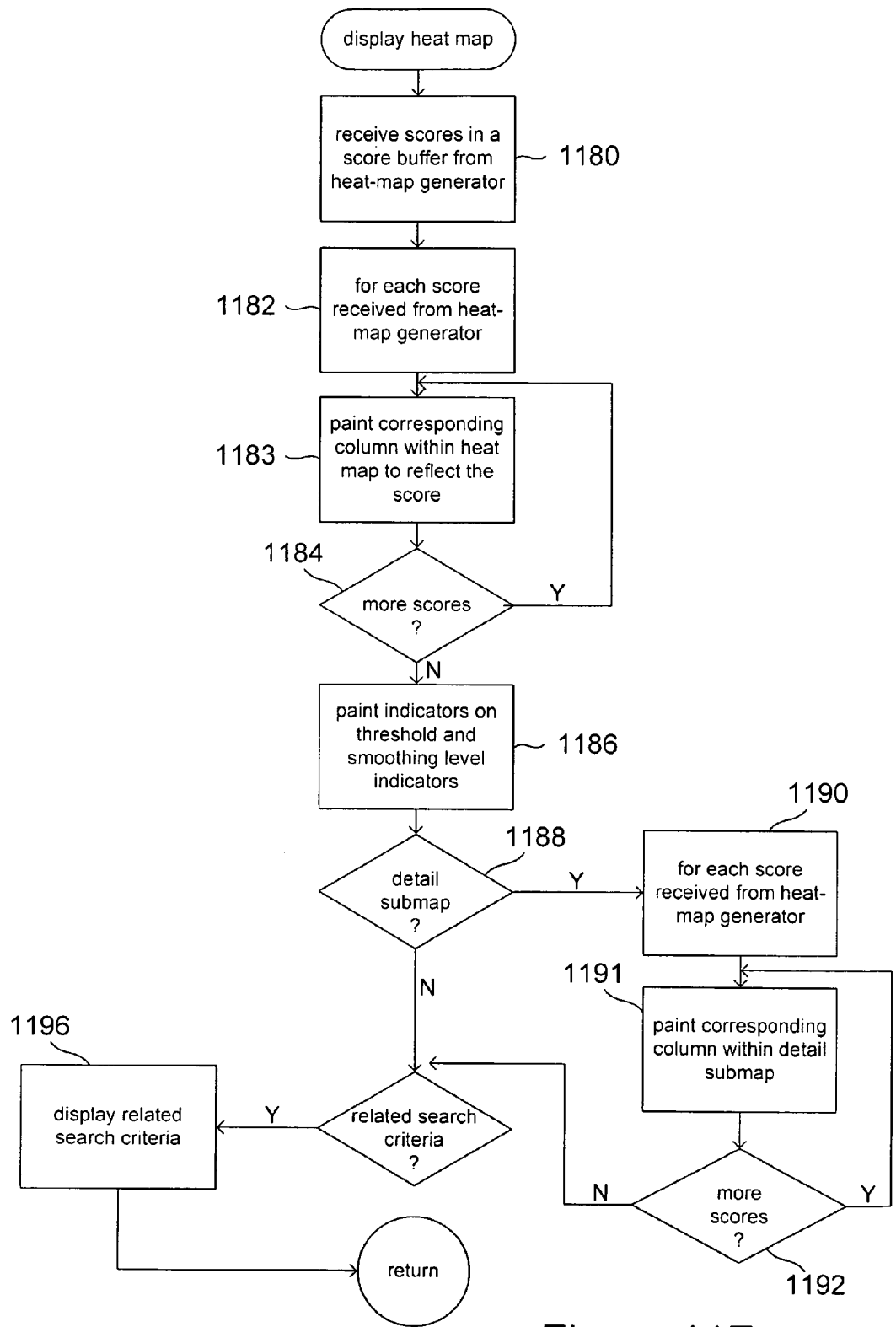

FIG. 11E provides a control-flow diagram for the display-heat-map routine called in step 1174 of FIG. 11D. In response to a request for a new heat map, a set of scores is received from the heat-map-generator entity in a score buffer, in step 1180. Then, in a loop comprising steps 1182-1184, each column or region representing an increment in position within the heat map is painted with a shade or color corresponding to the score or scores corresponding to that column or region. Then, in step 1186, any of the other features of the visual display, such as the threshold-selection 702 and smoothing-selection 704 features, are updated. If a detailed sub-map is being displayed, as determined in step 1188, then the columns or regions within the heat map are painted in the loop comprising steps 1190-1192. Finally, if related search criteria are being displayed (912 in FIG. 9), as determined in step 1194, then the display-related search criteria is updated, in step 1196, using related search criteria received from the heat-map generator.

Although the present invention has been described in terms of particular embodiments, it is not intended that the invention be limited to these embodiments. Modifications within the spirit of the invention will be apparent to those skilled in the art. For example, an almost limitless number of different implementations, and types of implementations, can be devised in order to incorporate a visual representation of a relatedness function computed with respect to an information encoding and search criteria specified by a user within an existing GUI, or to provide a new visual interface for user control of information-encoding rendering. As discussed above, the visual representation can take many different forms, and can either be incorporated within, or overlaid on, existing GUI features, or can be provided as one or more new features within an existing GUI or new GUI. In general, the visual representation uses visual-display parameters, such as a grayscale value, shading, color, or more complex color-related parameters to provide a visual indication of the relatedness metric or score computed at different positions within an information encoding. Particular embodiments include colorful heat maps representing relatedness metrics computed at fine granularity.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A visual interface system that facilitates identifying probable positions within a sequentially-played content at which audio information related to a search criterion can be found, the visual interface system comprising:
   a processing unit configured to be coupled to a display device, the processing unit configured to:
   cause the display device to display a user interface, the user interface configured to allow a user to enter a search-criterion, wherein the search criterion is directed to audio information within the sequentially-played content; and
   cause the display device to display a graphical representation of a relatedness function that displays graphical indications of the relatedness of audio information within the sequentially-played content to the search criterion at each position within a range of positions of the sequentially-played content, wherein:
      the relatedness function represents gradations between exact and unrelated matches to the search criterion that are aligned in time with the sequentially-played content;
      the gradations for each position within the range of positions of the sequentially-played content represent a magnitude of a relatedness metric computed as a numerical average of intermediate scores computed for each word in the search criterion for which a matching or related word is found within a window about the position; and
      each intermediate score is computed as a product of a position-offset factor and a closeness-of-match factor.

2. The visual interface system of claim 1 wherein the graphical representation of the relatedness function provides a visual indication at each position within the range of positions of the magnitude of the relatedness metric computed for audio information of the sequentially-played content within the window about the position with respect to the search criterion.

3. The visual interface system of claim 2 wherein the relatedness metric is a single numerical value that directly specifies, or that is used to compute, one of:
   a grayscale value;
   a shading type; and
   a color.

4. The visual interface system of claim 2 wherein the relatedness metric comprises two or more numerical values that directly specify, or that are used to compute, one of:
   a shading type; and
   a color.

5. The visual interface system of claim 2 wherein the relatedness function comprises two or more components that specify, or are used to compute, two or more parameters that together specify a color in a color-encoding system.

6. The visual interface system of claim 1 wherein the relatedness function assigns a plurality of windows, one window about each position within the range of positions of the sequentially played content, and computes the relatedness metric for each of the plurality of windows.

7. The visual interface system of claim 1 wherein the relatedness function smooths peaks by fitting a parametric smoothing function to each peak.

8. The visual interface system of claim 1 wherein the relatedness function further receives a relatedness-metric threshold and returns a minimum relatedness metric rather than returning the relatedness metric with a magnitude less than the relatedness-metric threshold.

9. The visual interface system of claim 8 wherein the relatedness function renormalizes computed relatedness metrics above the relatedness-metric threshold so that the renormalized relatedness metrics fall within the same range of magnitudes as they would were the relatedness-metric threshold equal to the minimum relatedness metric.

10. The visual interface system of claim 1 wherein the relatedness function applied to a particular sequentially-played content, at a particular, specified position or range of positions within the sequentially-played content, with respect to a specified search-criterion, additionally depends implicitly or explicitly on one or more of the following additional parameters:
   a type of sequentially-played content to which the relatedness function is applied;
   a type of specified search criterion;
   a type of relatedness metric to be returned by the relatedness function;
   a subject-matter domain to which the sequentially-played content and search criterion pertain;
   a degree of smoothing to apply to computed relatedness metrics;
   characteristics of a window used for comparing the search criterion to audio information at or near a position for which a relatedness metric is computed; and
   a relatedness-metric threshold.

11. The visual interface system of claim 10 wherein the user interface further includes a threshold-selection feature that allows a user to specify a relatedness-metric threshold for use in computing the relatedness metrics displayed by the graphical representation of the relatedness function.

12. The visual interface system of claim 10 wherein the user interface further includes a degree-of-smoothing-selection feature that allows a user to specify a degree of smoothing for use in computing the relatedness metrics displayed by the graphical representation of the relatedness function.

13. The visual interface system of claim 10 wherein the processing unit is further configured to cause the display to display a visual representation of a high-resolution, constricted-domain relatedness function, in addition to the graphical representation of the relatedness function, that can be invoked by a user of the visual interface system to view the relatedness of a subrange of positions within the sequentially-played content in greater detail.

14. The visual interface system of claim 10 wherein the processing unit is further configured to cause the display to display a related-search-criteria display that can be invoked by a user of the visual interface system to view search criteria related to a specified search criterion.

15. The visual interface system of claim 1 wherein the sequentially-played content is a video program that includes a sequence of video frames, wherein positions within the video program are specified in units of time from beginning of rendering of the video program by a video-rendering application, and wherein search criterion include words and phrases that are compared to words and phrases transcribed from the audio information.

16. The visual interface system of claim 1 wherein the user interface is incorporated into a graphical user interface through which a user controls rendering of sequentially-played content.

17. The visual interface system of claim 16 wherein the graphical representation of the relatedness function is superimposed over, or included within, a progress-display component of the graphical user interface.

18. The visual interface system of claim 16 wherein the graphical user interface includes features that allow a user to select a position within the sequentially-played content at which to start or resume information-encoding rendering.

19. The visual interface system of claim 1 wherein the sequentially-played content is one of:
   an encoded video recording;
   an encoded multimedia presentation;
   an encoded audio recording;
   a text document; and
   a sequence of images.

20. The visual interface system of claim 1 wherein the search criterion is one of:
   words and phrases;
   graphics;
   portions of images; and
   sounds.

21. A method for providing a visual interface that facilitates identifying probable positions within an sequentially-played content at which audio information related to specified search criterion can be found, the visual interface comprising:
   receiving a search-criterion entry; and
   providing a graphical representation of a relatedness function that displays graphical indications of the relatedness of audio information within the sequentially-played content to the specified search criterion at each position within a range of positions of the sequentially-played content;
   wherein the range of positions of the sequentially-played content corresponds to a sequence of information blocks of the sequentially-played content, and
   wherein the relatedness function represents gradations between exact and unrelated matches to the search-criterion that are aligned in time with the sequentially-played content, wherein the gradations for each position within the range of positions of the sequentially-played content represent a magnitude of a relatedness metric computed as a numerical average of intermediate scores computed for each word in the search criterion for which a matching or related word is found within a window about the position and wherein each intermediate score is computed as a product of a position-offset factor and a closeness-of-match factor.

22. A non-transitory machine-readable media having a set of instructions for identifying probable positions within an sequentially-played content at which audio information related to specified search criterion can be found, the instructions, when executed by at least one machine, cause the at least one machine to:
   receive a search-criterion; and
   provide a graphical representation of a relatedness function that displays graphical indications of the relatedness of audio information within the sequentially-played content to the specified search criterion at each position within a range of positions of the sequentially-played content;
   wherein the sequentially-played content comprises sequential audio information blocks and is configured to provide for the sequential reception of the information blocks by a human user, and
   wherein the relatedness function represents gradations between exact and unrelated matches to the search-criterion that are aligned in time with the sequentially-played content, wherein the gradations for each position within the range of positions of the sequentially-played content represent a magnitude of a relatedness metric computed as a numerical average of intermediate scores computed for each word in the search criterion for which a matching or related word is found within a window about the position and wherein each intermediate score is computed as a product of a position-offset factor and a closeness-of-match factor.

* * * * *